United States Patent [19]

Seike et al.

[11] Patent Number: 5,234,048
[45] Date of Patent: Aug. 10, 1993

[54] SEALING MEMBERS FOR GAS PREHEATERS, AND SEALING STRUCTURES USING SUCH SEALING MEMBERS FOR GAS PREHEATERS

[75] Inventors: Shoji Seike, Nagoya; Toshiichi Ikami, Konan; Masao Nishioka, Nagoya, all of Japan

[73] Assignee: NGK Insulators, Ltd., Japan

[21] Appl. No.: 818,563

[22] Filed: Jan. 9, 1992

[30] Foreign Application Priority Data

Jan. 14, 1991 [JP] Japan .................................. 3-16104
Jul. 2, 1991 [JP] Japan .................................. 3-187073
Jul. 2, 1991 [JP] Japan .................................. 3-187075

[51] Int. Cl.[5] ............................................. F16J 15/32
[52] U.S. Cl. ...................................... 165/9; 277/96.2; 277/227; 277/DIG. 6
[58] Field of Search ................... 277/53, 96.2, 235 R, 277/227, 235 A, DIG. 6; 165/9

[56] References Cited

U.S. PATENT DOCUMENTS

| | | | |
|---|---|---|---|
| 542,753 | 7/1895 | Burton . | |
| 3,203,472 | 8/1965 | Brandt | 165/10 |
| 3,246,352 | 4/1966 | Fladeland et al. . | |
| 3,407,866 | 10/1968 | Sawchuk . | |
| 3,692,097 | 9/1972 | Penny | 277/96.2 |
| 3,736,658 | 6/1973 | Weaver et al. | 228/122 |
| 3,743,008 | 7/1973 | Zeck et al. | 277/96.2 |
| 3,746,352 | 7/1973 | Bao et al. | 277/96 |
| 3,875,993 | 4/1975 | Penny | 277/96.2 |
| 3,903,959 | 9/1975 | Fushimi et al. . | |
| 3,907,311 | 9/1975 | Rao | 277/96.2 |
| 3,918,922 | 11/1975 | Anderson | 228/122 |
| 3,926,443 | 12/1975 | Fenerty et al. | 277/96.2 |
| 4,093,243 | 6/1978 | Kishida et al. . | |
| 4,135,038 | 1/1979 | Takami et al. | 174/52.4 |
| 4,135,686 | 1/1979 | Herpfer . | |
| 4,212,472 | 7/1980 | Mizuno et al. . | |
| 4,226,429 | 10/1980 | Sato et al. | 277/96.2 |
| 4,296,937 | 1/1981 | Handa | 165/9 |
| 4,364,729 | 12/1982 | Fresch . | |
| 4,911,227 | 3/1990 | Saito et al. . | |
| 5,102,029 | 4/1992 | Richardson | 228/124 |
| 5,145,011 | 9/1992 | Seike et al. | 165/9 |

FOREIGN PATENT DOCUMENTS

| | | |
|---|---|---|
| 1062003 | 9/1979 | Canada . |
| 0409551 | 1/1991 | European Pat. Off. . |
| 2540482 | 3/1976 | Fed. Rep. of Germany . |
| 2216538 | 8/1974 | France . |
| 57-33796 | 2/1982 | Japan . |
| 58-16188 | 1/1983 | Japan . |
| 0187794 | 11/1983 | Japan .................. 165/9 M |
| 59-84090 | 5/1984 | Japan . |
| 60-251391 | 12/1985 | Japan . |
| 61-161333 | 7/1986 | Japan . |

*Primary Examiner*—William A. Cuchlinski, Jr.
*Assistant Examiner*—D. G. DePumpo
*Attorney, Agent, or Firm*—Parkhurst, Wendel & Rossi

[57] ABSTRACT

A sealing structure for a rotary regeneration-type heat exchanger, the sealing structure being adapted to seal at least one of a gap between an outer peripheral portion of a rotor and a stationary housing and a gap between a side face of the rotor and a radial sealing plate, the sealing structure being held by one of the rotor and the housing such that the sealing structure is in sliding contact with an opposing surface of the other of the rotor and the housing, the sealing structure including a metal frame, a main body including an alumina body and a glaze covering a portion of the alumina body, the glaze having a coefficient of thermal expansion smaller than that of the alumina body, the main body including an uncovered surface which is not covered with the glaze thereby exposing the alumina body, and retaining means for retaining the main body inside the metal frame, wherein the uncovered surface is exposed from the metal frame, the uncovered surface at least partially defining a sliding surface of the sealing structure.

14 Claims, 17 Drawing Sheets

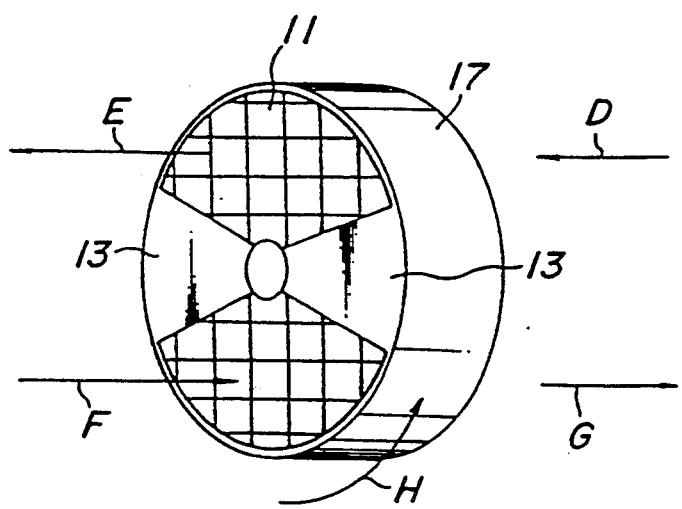
FIG_1

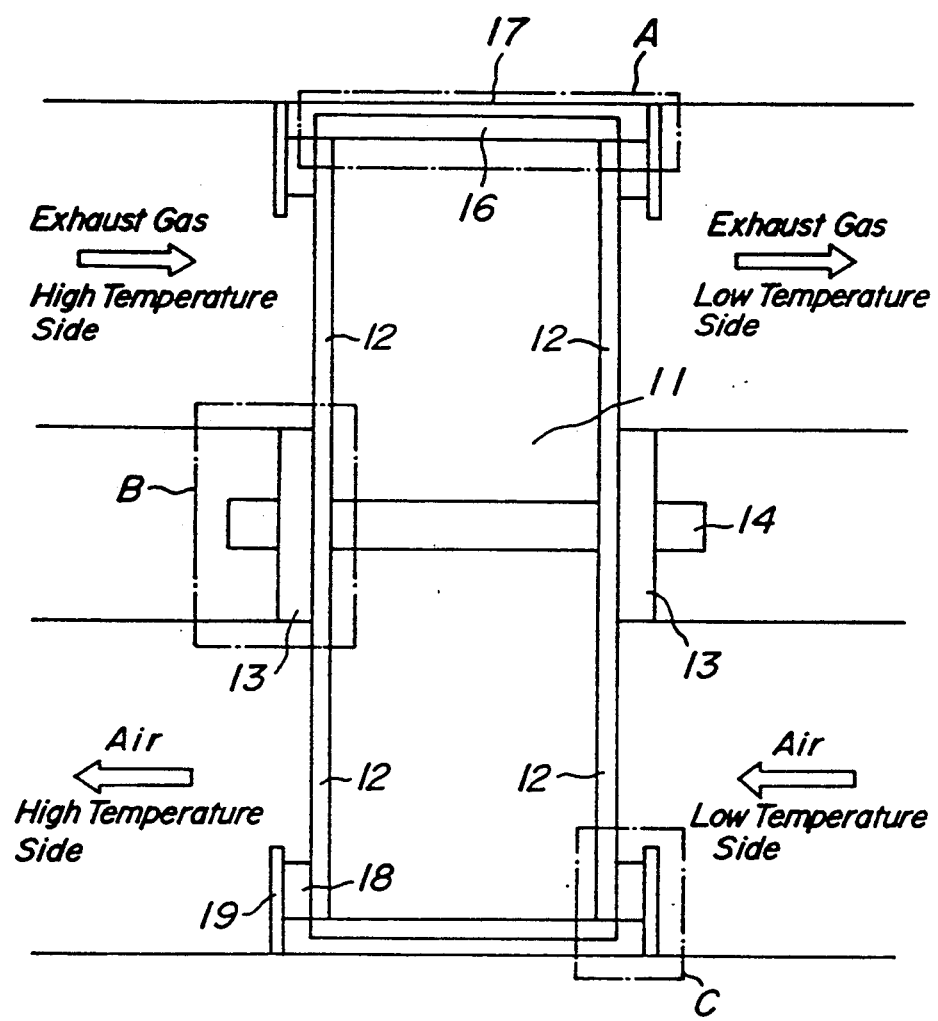

FIG_3
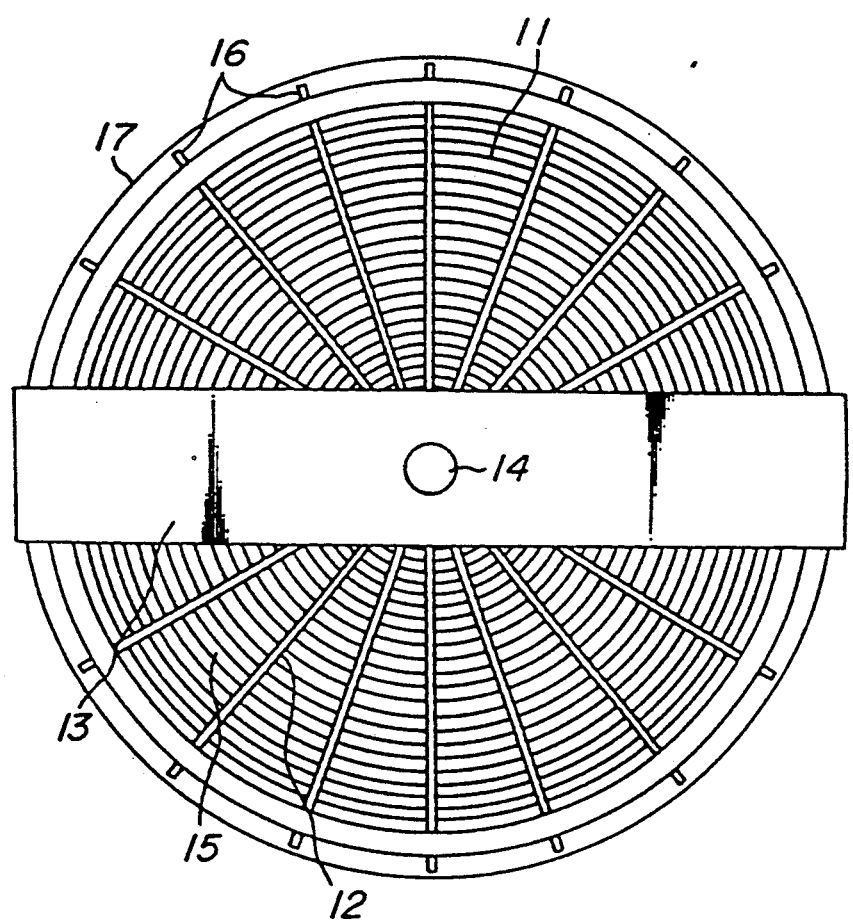

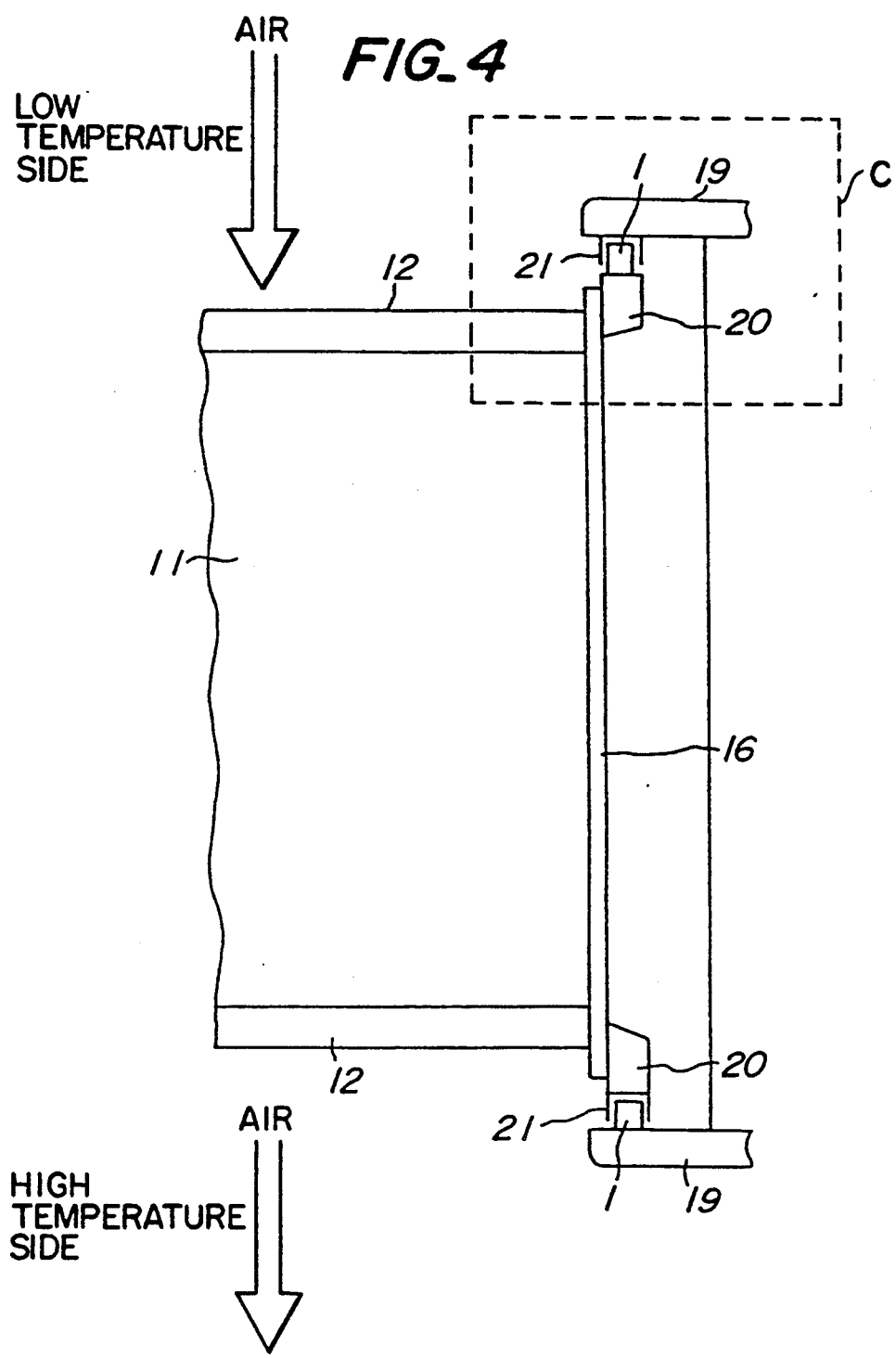

FIG_5a
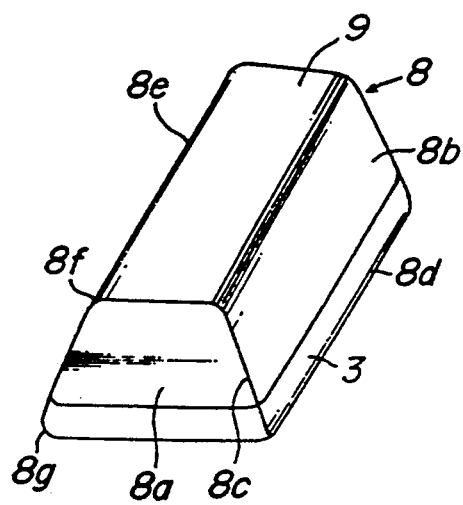
FIG_5b
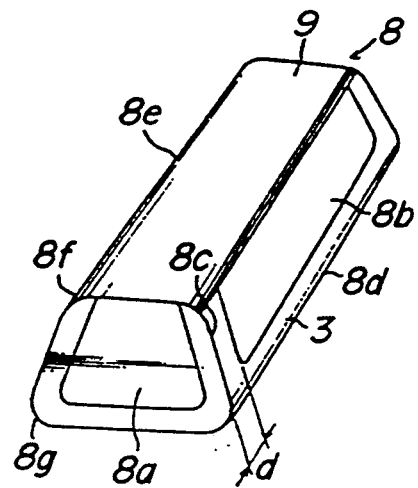
FIG_5c
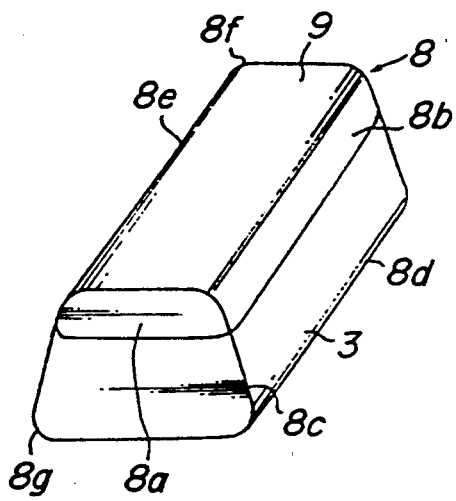
FIG_5d
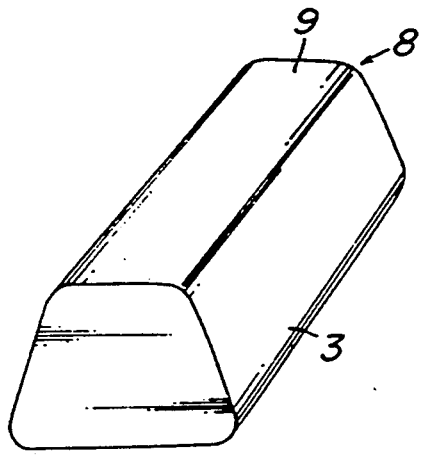

FIG_7
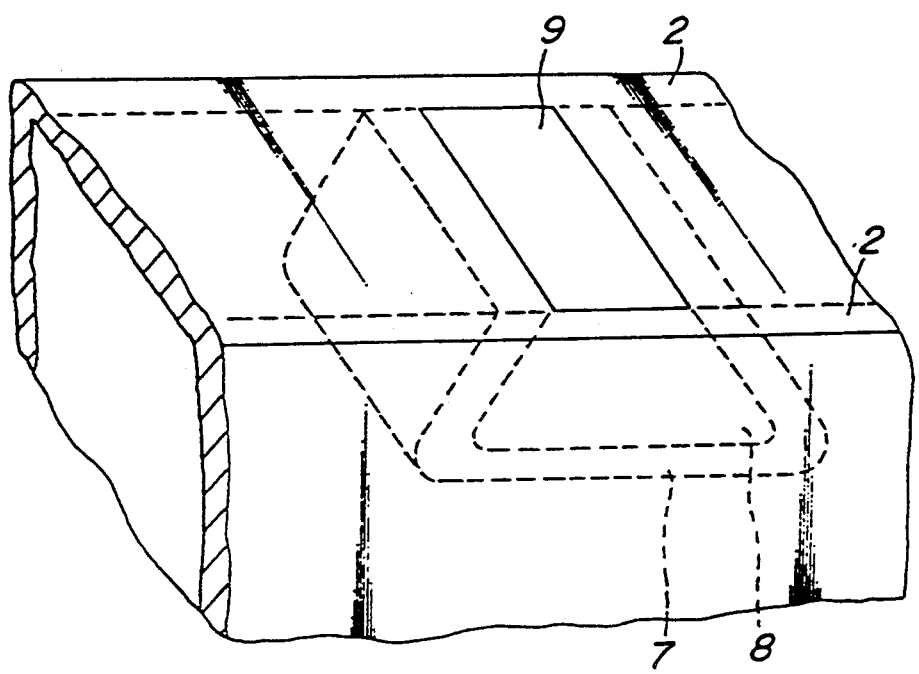
FIG_8
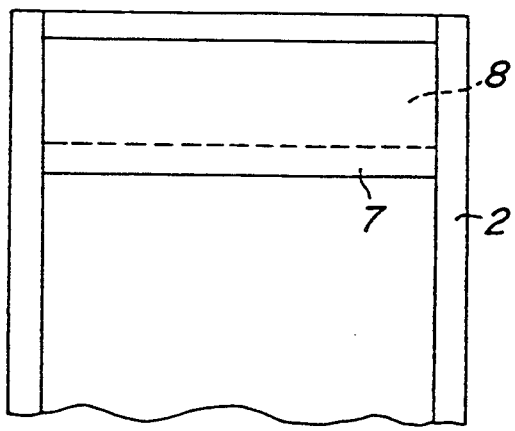

FIG_10

FIG_11

FIG_13

FIG_15

FIG_17

SEALING MEMBERS FOR GAS PREHEATERS, AND SEALING STRUCTURES USING SUCH SEALING MEMBERS FOR GAS PREHEATERS

BACKGROUND OF THE INVENTION

1. Field of the Invention

The present invention relates to sealing members for gas preheaters such as air preheaters, and sealing structures using such sealing members for the gas preheaters.

2. Related Art Statement

An air preheater is used for recovering heat from exhaust gases through heat exchange to preheat combustion air. Such preheaters are used in power generating boilers and ship boilers as well as chemical plants or equipment such as an oil-producing furnace, distillation furnace and a reforming furnace. FIG. 1 is a schematic perspective view of such an air preheater.

A rotor 11 is rotatably placed inside a rotary housing 17, and two radial sealing plates 13 are provided on each of side faces of the rotor 11. The rotor housing 17 is supported by a pedestal not shown, and the rotor is rotated in a direction of an arrow H.

A hot exhaust gas is passed through an upper side of the rotor 11 in a direction of an arrow D, whereas air is passed through a lower side of the rotor in the opposite direction as shown by an arrow F. An exhaust gas layer and an air layer are isolated from each other by the radial sealing plates 13. The rotor 11 is provided with heating elements, which absorb heat from the hot exhaust gas flowing in the D-direction. As the rotor 11 rotates, cold air passing along the heating elements is heated and sent to a boiler or the like in a direction of an arrow G. On the other hand, since heat is derived from the hot exhaust gas, cooled exhaust gas is discharged outside in a direction of an arrow E.

In such an air preheater, gaps exist between an outer peripheral portion of the rotor 11 and housing and between side faces of the rotor and the radial sealing plates 13, respectively, so that exhaust gas and air leak through these gaps which lowers thermal efficiency. Therefore, in order to improve sealing, it is important to make these gaps as small as possible.

Sealing of the gap between the outer periphery of the rotor 11 and the housing 17 is effected by a structural sealing in which the above gap between them is made as small as possible.

The temperature of the exhaust gas is in a range of 300°–400° C., and that of air is in a range of room temperature to about 100° C. The rotor 11, which receives the heating elements, is deformed corresponding to such changes in temperatures. Accordingly, gaps due to expansion may form because of such changes in temperatures, resulting in deterioration of the sealing effect.

On the other hand, sealing of the gap between the side face of the rotor 11 and the radial sealing plate 13 is also effected by a structural sealing in which twelve or twenty diaphragm plates are provided on the side surface of the rotor, and a gap defined between the diaphragm plates and the radial sealing plate is made as small as possible.

Such structural sealings have a limited sealing effect. When the structural materials are corroded with a gas component in the exhaust gas, the gaps between the structural materials becomes greater, thereby lowering the sealing effect.

In view of this, it is expected that the sealing effect is improved by not only reducing the gaps between the structural materials but also, for example, sliding, under pressure, a sealing member attached to the outer peripheral portion of the rotor upon the opposite housing.

A slidable member to be used in a rotary type air preheater for combustion in a boiler in such as a thermal power generation plant is required to have excellent wear resistance, excellent corrosion resistance and excellent thermal shock resistance. Although a conventional sealing member uses an SS steel or a corrosion resistive steel, such a sealing member has inadequate wear resistance and corrosion resistance, so that frequent maintenance is necessary, and such a sealing member is not satisfactory as a sliding member.

That is, since a fuel to be used for combustion in the boiler for a thermal power generating plant and the like is coal, heavy oil or the like, corrosive gases such as oxides of sulfur and oxides of nitrogen are contained in the hot exhaust gas. Thus, dew drops are formed at a lower temperature portion of the air preheater, so that parts of the air preheater are likely to be corroded.

A proposed solution to the above problem utilizes a sealing member made of an inorganic glass or a wear resistive ceramic. This sealing member is preferably slid with, for example, a sealing bar, under pressure, and the sealing effect can be most effectively exhibited by so doing.

However, inventors' further examination revealed that certain problems remain unsolved. That is, since the heat exchanging efficiency of the air preheater is deteriorated when dust in the hot exhaust gas attach to the parts such as the heat elements of the air preheater, the air preheater is washed with water to remove the attached dust at periodically. Since a boiler for a thermal power generating plant or the like is continuously operated for an extended period of time and can only be stopped for a short period of time, the air preheater must be washed with water to remove the attached matter in the state that the air preheater is not fully cooled (i.e., at about 200° C.).

Accordingly, the air preheater is thermally shocked due to a difference in temperature, for example 170°–200° C. Therefore, there is a problem in that when the sealing member employs alumina ceramic having extremely excellent wear resistance, the alumina ceramic will be broken by thermal shock.

Further, the rotary air preheater for combustion in a boiler to be used in a thermal power generating plant and the like is a large size apparatus in which the diameter of the rotor is 1–20 m, and parts used in the preheater are bulky. For example, a single sealing member having the size of 200×100×50 mm is used. Therefore, the size of the ceramic used for such a sealing member is naturally large. Thus, the sealing member is extremely fragile against thermal shock due to its shape and large size.

SUMMARY OF THE INVENTION

It is therefore an object of the present invention to provide a sealing member for a gas preheater, which sealing member has high wear resistance and high corrosion resistance, as well as thermal shock resistance high enough to withstand washing with water even when hot.

It is another object of the present invention to provide a sealing structure for the gas preheater, which sealing structure has high wear resistance and high corrosion resistance as well as thermal shock resistance high enough to withstand washing with water even when hot.

More particularly, the present invention relates to the sealing member for the gas preheater, which sealing member is adapted to seal a gap between the outer peripheral portion of a rotor and a housing of the gas preheater or a gap between a side face of the rotor and a radial sealing plate, and includes a main body made of an alumina ceramic, and a film formed on a surface of the main body, the film being made of a glaze having a coefficient of thermal expansion smaller than that of the main body.

The invention also relates to the sealing structure for the gas preheater, which sealing structure includes a hollow frame body, a slip fall-preventing member fixed to the frame body such that the slip fall-preventing member projects in an inner space of the frame body, and the above sealing member is inserted into the slip fall-preventing member, wherein a flat sliding surface of the sealing member is exposed outside the frame body through an open hole of the frame body. The sealing member, excluding the sliding surface, is covered with the frame body and the slip fall-preventing member.

According to the present invention, since a main body of the sealing member for the gas preheater is made of alumina ceramic, a worn amount of the sliding surface of the sealing member can be reduced, and corrosion of the sliding surface with oxides of sulfur and oxide of nitrogen can be suppressed. That is, although oxides of sulfur, oxides of nitrogen, etc., which are contained in the exhaust gas passing through the air heater are converted to sulfuric acid, sulfurous acid, nitric acid, nitrous acid, etc. upon reaction with water, alumina ceramic is stable against such products because the alumina ceramic has higher hardness and more better wear resistance as compared with metals.

On the other hand, alumina ceramic has a characteristic of low thermal shock resistance, and therefore cannot withstand washing with water when hot about (200° C.). However, according to the present invention, since the surface of the main body of the sealing member is provided with a film of a glaze having the coefficient of thermal expansion smaller than that of the main body made of the alumina ceramic, the glaze acts as a compressing glaze, so that the glaze protects the alumina ceramic main body from the thermal shock owing to washing with water, etc.

By employing the above-mentioned special construction, the sealing member according to the present invention simultaneously satisfies very high wear resistance, very high corrosion resistance and very high thermal shock resistance.

In order to obtain the above-mentioned excellent functions and effects, it is preferable that difference in coefficient of thermal expansion between the main body of the sealing member and the film is not less than $9 \times 10^{-7}/°C$. and not more than $50 \times 10^{-7}/°C$. Further, in order to maintain wear resistance and corrosion resistance at high levels, it is preferable that the content of alumina in the alumina ceramic constituting the main body of the sealing member is not less than 85% by weight.

Furthermore, when only the alumina ceramic is exposed to the sliding surface of the sealing member, high wear resistance possessed by the alumina ceramic can be effectively exhibited. In this case, it is preferable that 50% or more of the total surface area of the sealing member excluding the sliding surface is covered with the film made of the glaze, because this is effective for improving thermal shock resistance of the sealing member. From this point of view, it is also preferable that the thickness of the film is not less than 100 $\mu$m.

The present inventors further examined the prior alumina sealing member, and found out that a certain problem remains unsolved. That is, when the wear resistive alumina ceramic is slid for a long time period under pressure, the ceramic is worn, and sliding sounds generated during sliding of the sealing member under pressure are very loud. Such sounds are uncomfortable to deteriorate the working environment.

In view of this, it is a further object of the present invention to provide a sealing structure for a gas preheater, which sealing member can effectively prevent corrosion with hot exhaust gases, can maintain excellent sealing performance for a long period, can greatly reduce wearing of an inorganic glass or a wear resistive ceramic, can reduce loud sliding sounds.

More particularly, the present invention also relates to the sealing structure for the gas preheater, which sealing structure is adapted to seal a gap between an outer peripheral portion of a rotor and a housing of the gas preheater or a gap between a side face of the rotor and a radial sealing member, wherein the sealing structure includes at least a sealing member of which at least part is made of an inorganic glass and/or a wear resistive ceramic, and a solid lubricant-molded body which is to be pressed against a sliding surface of an opponent member onto which the sealing member is slid.

It is preferable that the sealing member includes a pressing means for pressing the solid lubricant-molded body against the sliding surface of the opponent member, the pressing means including a pressing member having one end rotatably fitted to a fitting shaft, while the other end portion contacts the solid lubricant-molded body, and an urging member fitted to the pressing member to urge the pressing member toward the sliding surface.

It is also preferable that the sealing member includes a pressing means for pressing the solid lubricant-molded body against the sliding surface of the opponent member, the pressing means including a guide member inserted into a guide hole bored in the solid lubricant-molded body, and an urging member for pressing the solid lubricant-molded body against the sliding surface by urging the solid lubricant-molded body through the guide member in a longitudinal direction of the guide member.

As to the sealing structure provided with the solid lubricant-molded body according to the present invention for use in the gas preheater, it is preferable that when the main body of the sealing member is made of alumina ceramic, the surface of the main body is provided with a film of a glaze having a coefficient of thermal expansion smaller than that of the main body.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains, without departing from the spirit of the invention or the scope of claims appended hereto.

BRIEF DESCRIPTION OF THE DRAWINGS

For a better understanding of the invention, reference is made to the attached drawings, wherein:

FIG. 1 is a schematic perspective view illustrating a construction of an air preheater to which the present invention is applied;

FIG. 2 is a schematic side view illustrating the entire air preheater;

FIG. 3 is a schematic front view illustrating the entire air preheater;

FIG. 4 is a schematic view illustrating a portion of a vertical shaft type air preheater including an outer peripheral portion of the rotor, showing "bypass seal C" of FIG. 2;

FIGS. 5a, 5b, 5c and 5d are perspective views of sealing members according to the present invention to be used for bypass sealing in the air preheater;

FIG. 7 is a broken perspective view of a main portion of the sealing structure;

FIG. 8 is a side view of a part of the sealing structure;

DETAILED DESCRIPTION OF THE INVENTION

Figure 6:
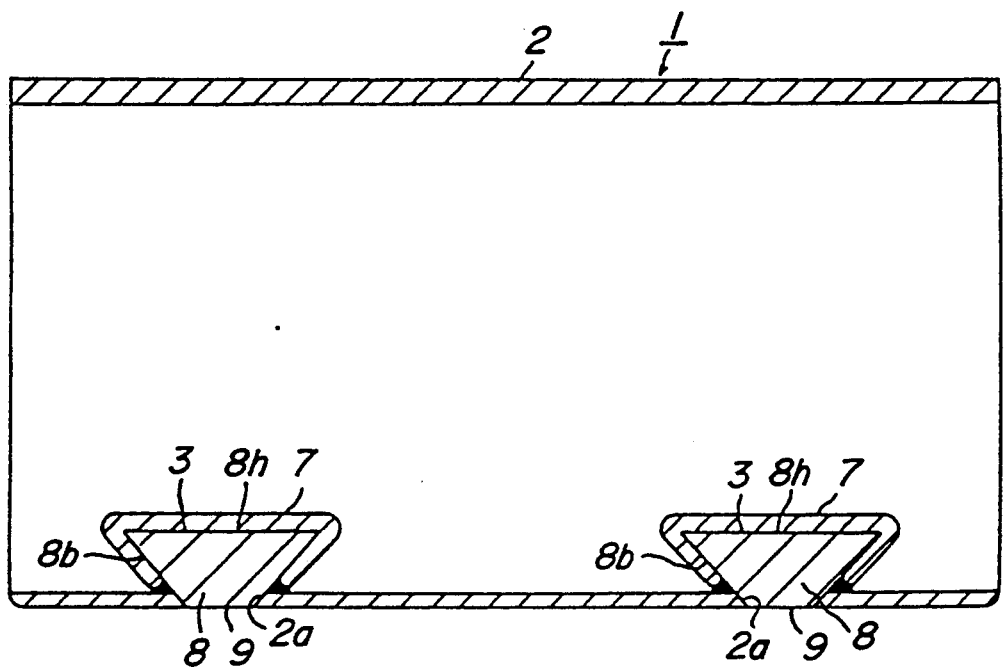
FIG. 6 is a sectional view of a sealing structure according to the present invention.

The air preheater (an example of the gas preheater) to which the sealing member and the sealing structure according to the present invention are to be applied will be briefly explained.

FIG. 2 is the schematic side view of the air preheater, and FIG. 3 is a schematic front view thereof. A rotor 11 is supported by a rotary shaft 14, and received in a housing 17. The rotor 11 is divided into twelve or twenty segments by diaphragm plates 12, and heating elements 15 are placed in these segments. The housing is divided into an exhaust gas section and an air section. As the rotor rotates, heat possessed by the exhaust gas is accumulated in the heating elements in the exhaust gas section, and accumulated heat heats air in the air section. For example, temperatures of the exhaust gas and air are 350° C. and 60° C., respectively, and when the exhaust gas passes the air preheater, the exhaust gas is cooled to 140° C. On the other hand, when air passes the preheater, air is heated to 300° C. Then, air is compressed and flowed into a boiler. Since difference in pressure between the exhaust gas and the air is, for example, around 2500 mmaq, a small amount of air leaks into the exhaust gas section when air passes through the air preheater.

This leakage occurs through gaps between the diaphragm plates 12 and radial sealing plates 13 along the opposite faces of the rotor on one hand, and through gaps between auxiliary sealing plates 16 and the outer peripheral portion of the housing 17. Further, as the rotor rotates, the exhaust gas and air held in the heating elements flow into the air section and the exhaust gas section, respectively, resulting in leakage of the exhaust gas and air.

In order to make such a leakage as small as possible, various sealing structures are designed. A sealing method by which the gaps between the diaphragm plates 12 and the radial sealing plates 13 are made as small as possible is called "radial seal B". A sealing method by which the gaps between the axial sealing plates 16 arranged on the outer periphery of the rotor and the housing 17 are made as small as possible is called "axial seal A". A sealing method in which a sealing structure 18 is provided at the side face of the rotor at the outer periphery and a gap between the sealing structure 18 and a sealing bar 19 fitted to the housing 17 is made as small as possible to prevent flow of the exhaust gas and air into the gap between the outer periphery of the rotor and the housing is called "bypass seal C".

The sealing member according to the present invention is applied to at least one of the radial seal B, the axial seal A and the bypass seal C at three locations. That is, the seal for the gap between the outer peripheral portion of the rotor and the housing of the gas preheater corresponds to the axial seal A and the bypass seal C. The seal for the gap between the side face of the rotor and the radial sealing plate corresponds t the radial seal B.

First, an embodiment of the present invention applied to the bypass seal C will be explained.

FIG. 4 is a schematic view illustrating a portion of the vertical shaft type air preheater near an outer periphery of a rotor.

In this embodiment, the present invention is applied to the sealing between the edge portion of the outer periphery of the rotor 11 and the housing.

That is, in the bypass seal on an upper side in FIG. 4, a holder 21 is fixed to a sealing bar 19, and a sealing structure 1 is held inside the holder 21. The sealing structure 1 is slightly vertically movable inside the holder 21. A sealing surface of the sealing structure 1 contacts with and slides on a tire 20 of the rotor by its own self-weight. A slight gap exists between the sealing structure 1 and the sealing bar 19. By employing such a construction, even when the rotor 11 is expanded and contracted with heat, the sealing structure 1 follows the deformation of the rotor 11.

In the bypass seal on a lower side in FIG. 4, a holder 21 is fixed to the tire 20 of the rotor, and the sealing structure 1 is held in the holder 21. The sealing structure 1 is slightly vertically movable inside the holder 21, and the sliding surface of the sealing structure 1 contacts with and slides on the sealing bar 19 by its own self-weight.

In the case of the above-mentioned vertical shaft type air preheater, the sealing structure 1 is pressed against the sealing bar 19 or the tire 20 of the rotor by the self-weight of the sealing structure 1. On the other hand, since the self-weight of the sealing structure 1 cannot be utilized in the case of the horizontal shaft type air preheater, the sealing structure 1 must be urged toward the opposed member by a leaf spring, a coil spring or the like.

The sealing structure 1 has a structure in which the sealing member according to the present invention is attached to a hollow frame body. Specific structural embodiments of the sealing members according to the present invention for the air preheater will be explained by referring to FIGS. 5a through 5d, and then the entire construction of the sealing structure in which such sealing members are attached will be explained by referring to FIGS. 6 through 8.

As shown in FIGS. 5a through 5d, a main body 8 made of alumina ceramic is shaped in the form of a pyramid frustrum form, and its bottom face and sliding surfaces 9 are rectangular. The surface of the main body 8 consists of a pair of a trapezoidal side surfaces 8a, a pair of rectangular side surfaces 8b, bottom surface and the sliding surface 9. Four edges 8c are defined among the side surfaces 8a and 8b and the bottom surface, and four edges 8e are formed among side surfaces 8a, 8b and the bottom surface and the sliding surface 9. Four vertexes 8f are formed at intersections among the side surfaces 8a, 8b and the sliding surface 9, and four vertexes 8g are formed at intersections among the side surfaces 8a, 8b and the bottom surface.

The bottom surface and a lower portion of the side surfaces 8a and 8b are covered with a film 3 made of a glaze, and alumina ceramic is exposed at the sliding surface 9 and an upper portion of the side surfaces 8a and 8b. Fifty % of the total area of the side surfaces 8a and 8b and the bottom surface is covered with the film 3, and alumina ceramic is exposed at the remaining portion of 50% not covered with alumina ceramic. It is preferable that the radius of curvature of the edges 8c, 8d and 8e and the vertexes 8f and 8g is not less than 2 mm.

In the embodiments shown in FIG. 5b, the edge portions 8c and 8d and the vertex 8g not contacting the sliding surface are covered with a film 3 of the glaze, and the bottom surface is also covered. Alumina ceramic is exposed in a trapezoidal shape in the side surface 8a, whereas alumina ceramic is exposed in a rectangular shape in the side surface 8b. By so constructing, the function of the film 3 as a compressing glaze is further enhanced.

In the embodiment shown in FIG. 5c, the bottom surface and a lower portion of the side surfaces 8a and 8b are covered with the glaze film 3 in the same manner as in the embodiment of FIG. 5a. Seventy % of the total area of the surface of the main body excluding the sliding surface 9, i.e., 70% of the total area of the side surfaces 8a and 8b and the bottom surface, is covered with the film 3, and alumina ceramic is exposed at the remaining 30% surface area. In the embodiment in FIG. 5d, alumina ceramic is exposed at the sliding surface 9, and the remaining surface is entirely covered with the film 3.

An example of the composition of the glaze usable under the above-mentioned conditions is given below.

| | | |
|---|---|---|
| SiO$_2$ | 60.0–74.0% | by weight |
| Al$_2$O$_3$ | 11.0–17.0% | by weight |
| Fe$_2$O$_3$ | <0.7% | by weight |
| TiO$_2$ | <0.3% | by weight |
| CaO | 1.0–5.0% | by weight |
| MgO | 1.0–5.5% | by weight |
| K$_2$O, Na$_2$O | 3.0–8.0% | by weight |
| ZrO$_2$ | 1.5–3.5% | by weight |
| BaO | <4.0% | by weight |
| MnO, CoO | <0.3% | by weight |

FIG. 6 is a sectional view of a sealing structure 1 in which, for example, two sealing members as shown in FIG. 5d are fitted. FIG. 7 is a broken perspective view of a principal portion of the sealing structure 1. FIG. 8 is a side view of the sealing structure 1. In FIGS. 7 and 8, the film 3 is not shown.

A hollow frame body 2 having an almost parallelopiped shape is preferably made from a corrosion resistive steel, and vertex portions of the frame body 2 are rounded by R. A plurality (two in this embodiment) of holes 2a are formed in a longitudinal direction on that side of the frame body 2 which is opposed to a sealing bar. A slip fall-preventing member 7 is fixed to the frame body inside the each of two holes 2a by welding or the like. The slender sealing member 8 having a trapezoidal section is inserted into the slip fall-preventing member 7. The flat sliding surface of the sealing member to be slid onto the sealing bar is exposed, whereas the remaining portion is substantially covered with the frame body 2 and the slip fall-preventing member 7, and not exposed outside. That is, the side surfaces 8b and the bottom surface 8h are covered with the slip fall-preventing member 7, and the side surface 8a are covered with the frame body 2.

According to this embodiment, since the sliding surface 9 of the sealing member 8 is slid on the sealing bar under pressure, the above-mentioned effects of the alumina ceramic are so greatly exhibited that the sealing member does not undergo deformation, wear and corrosion, and the heat efficiency is further improved by always preventing occurrence of gaps between the sliding surface of the sealing member and the sealing bar.

Since the surface of the main body 8 made of alumina ceramic is provided with the film of the glaze having the coefficient of thermal expansion smaller than that of the main body, the glaze acts as the compressing glaze as mentioned above, and protects the main body 8 of alumina ceramic against thermal shock due to washing with water, etc.

In addition, since the sealing member is covered with the corrosion resistive steel excluding the sliding surface 9, the corrosion resistive steel also acts as a buffer against thermal shock due to washing with water, etc.

Therefore, the sealing member and the sealing structure according to the present invention yield improved sealing, and long service life, more effective preheating of the air for thermal power generation, ship boiler, etc. Furthermore, when the sealing member and the sealing structure are applied to a chemical apparatus such as an oil-producing, oil-distillation or oil-reforming furnace, the heat-recovering efficiency is improved. Moreover, safety during use is high, and frequency of maintenance can be reduced.

Next, concrete experimental results will be explained.

EXPERIMENT 1

First, sealing members as shown in FIG. 5d were prepared and were subjected to temperature differences during a heating-cooling test. The sealing members were examined for cracks. Specifically, main bodies each having a width of 45±0.5 mm, a height of 20±0.3 mm, and a length of 42±0.3 mm with vertex portions all having the radius of curvature of 2 mm were prepared. The content of $Al_2O_3$ in the alumina ceramic was 96% by weight. A slip of a glaze was sprayed onto the entire surface of each of the main bodies 8 at a given thickness, excluding the sliding surface 9 in followed by drying, firing and cooling to prepare test samples.

Figure 9:
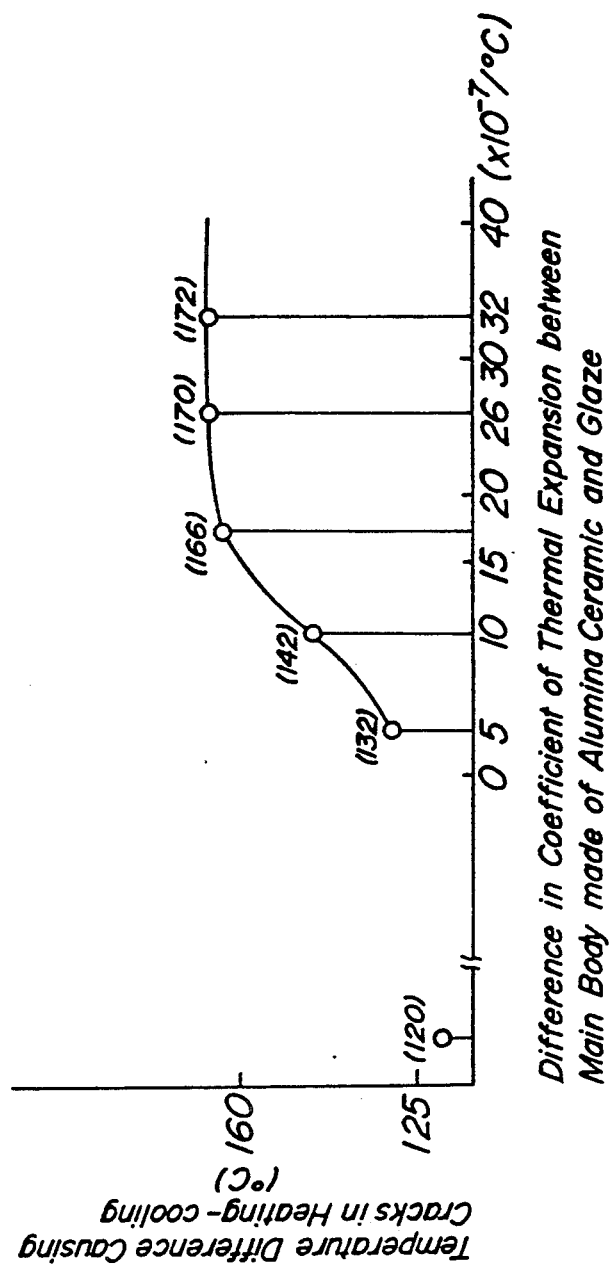
FIG. 9 is a graph showing the relationship between difference in coefficient of thermal expansion between the main body made of alumina ceramic and the glaze and temperature difference causing cracking in heating-cooling test.

The thickness of the film of the glaze after the firing was 100±20 μm. As shown in FIG. 9, the difference in coefficient of thermal expansion between the main body of alumina ceramic and the glaze was variously changed by changing the composition of the glaze, and each test sample was subjected to a thermal shock resistance test.

More specifically, after each test sample was kept at a given temperature for a sufficiently long time, the sample was immersed into a water vessel having a great amount of water at a given temperature for a given time period. After the sample was taken out from the water vessel, any cracks in the sample were checked with a fucshion liquid. A minimum value among temperature differences between the heating temperature and the temperature of water causing cracks in the sample was taken as "temperature difference (°C.) causing cracks in heating-cooling test". The results are shown in FIG. 9.

As is seen from the results shown in FIG. 9, the temperature difference causing the cracks in heating-cooling test was 120° C. with respect to the sample having no glaze on the surface, whereas the temperature difference causing the cracks in heating-cooling test became greater with respect to the samples having the glaze applied to the entire surface excluding the sliding surface, as the difference in coefficient of thermal expansion between the alumina ceramic and the glaze became greater. More concretely, the temperature difference causing the cracks in heating-cooling test greatly increased when the difference in coefficient of thermal expansion was about $9 \times 10^{-7}$/°C., and the temperature difference became almost constant when the difference in coefficient of thermal expansion was about $20 \times 10^{-7}$/°C. The upper limit is preferably not more than $50 \times 10^{-7}$/°C. If the difference in coefficient of thermal expansion exceeds $50 \times 10^{-7}$/°C., there may be possibility that the coated glaze peels.

It is preferable that the main body made of alumina ceramic is preheated to about 150° C. before the slip of the glaze is applied to the main body, because the glaze can be coated in a considerably high and uniform thickness.

EXPERIMENT 2

Figure 10:
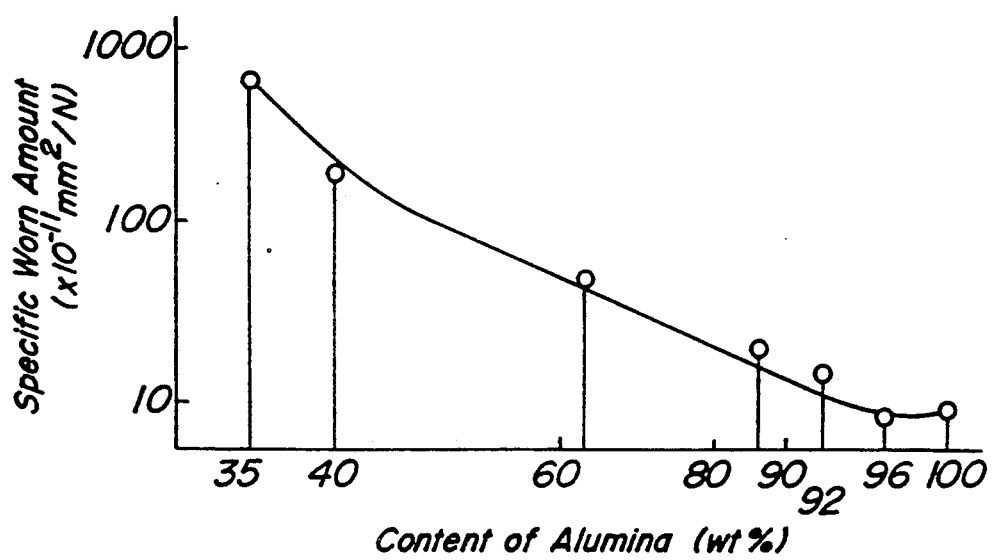
FIG. 10 is a graph showing the relationship between the content of alumina in the main body and the specific worn amount.

The content of alumina in the main body 8 was changed as shown in FIG. 10, the main body was arranged to slide along an opposed member made of SS 400 iron under pressure, and a specific worn amount ($\times 10^{-11}$ mm$^2$/N) of the main body 8 was measured.

As is seen from results in FIG. 10, as the content of alumina in the main body 8 increases, the specific worn amount decreased in the manner of geometric progression. Particularly, when the content of alumina is set to not less than 85% by weight, the specific worn amount of the main body is not more than $30 \times 10^{-11}$ mm$^2$/°C. so that practically high wear resistance can be obtained.

EXPERIMENT 3

With respect to the alumina ceramic main bodies not coated with the glaze, the content of alumina was changed as shown in Table 1, and the temperature differences causing cracks in heating-cooling test were measured. As is seen from Table 1, as the content of the alumina increases, the temperature difference causing the cracks in heating-cooling test decreases. When the content of alumina was 96% by weight, the temperature difference causing cracks in heating-cooling test was reduced to 120° C.

To the contrary, samples as shown in FIG. 5d were obtained by applying a glaze A having the coefficient of thermal expansion of $69 \times 10^{-7}$/°C. or a glaze B having the coefficient of thermal expansion of $52 \times 10^{-7}$/°C. onto the entire surface of the main body excluding a sliding surface in a thickness of 550 μm. Results thereof are shown in Table 1.

TABLE 1

| Sample | Alumina content (wt %) | | | |
| --- | --- | --- | --- | --- |
| | 35 | 62 | 85 | 96 |
| Alumina ceramic main body | 182 | 163 | 131 | 120 |
| Alumina ceramic coated with glaze A | 184 | 168 | 203 | 202 |
| Alumina ceramic coated with glaze B | 190 | 171 | 210 | 208 |

As is seen from Table 1, the measurement of the temperature differences of those samples causing cracks in heating-cooling test revealed that the temperature differences increased by applying the glaze. Particularly, when the content of alumina was 85% by weight or more, the temperature difference causing cracks in heating-cooling test were great. For example, when the content of alumina was 96% by weight and the glaze having the coefficient of thermal expansion of $52 \times 10^{-7}$/°C. was applied, the temperature difference causing cracks in heating-cooling test increased by 88° C. Therefore, it is clear that when the glaze is applied to alumina ceramic having high wear resistance and high corrosion resistance but low thermal shock resistance, the alumina ceramic can sufficiently withstand thermal shock of the temperature difference of 170°–200° C.

EXPERIMENT 4

Sealing members as shown in FIG. 5d were prepared. The content of alumina in a main body 8 was 96% by weight, and difference in coefficient of thermal expansion between the main body 8 and the film 3 of the glaze was set at $26 \times 10^{-7}$/°C. While the thickness of the glaze was increased, the temperature differences causing cracks in heating-cooling test were measured Results obtained are shown in Table 2. That is, when the glaze having the thickness of 100 μm or more is applied, the temperature difference causing cracks in heating-cooling test is remarkably increased, and thermal shock resistance can be afforded upon the alumina ceramic to make it possible to use the alumina ceramic as a sealing member.

TABLE 2

| Thickness of film of glaze (μm) | Temperature difference in causing cracks in heating-cooling test (°C.) |
| --- | --- |
| 0 | 120 |
| 50 | 130 |
| 90 | 140 |
| 100 | 170 |
| 320 | 182 |
| 550 | 208 |
| 780 | 210 |

EXPERIMENT 5

Main bodies having the dimension given in Experiment 1 were prepared. The content of alumina in the main body 8 was 96% by weight, and the difference in coefficient of thermal expansion between the main body 8 and the glaze was set at $26 \times 10^{-7}/°C$. The thickness of the glaze was 550 μm. The glaze was applied to the main body 8 as shown in FIGS. 5a, 5b, 5c or 5d to prepare test samples.

More specifically, 50% of the entire surface of the test sample in FIG. 5a, excluding a sliding surface 9, was covered with the glaze. In the test sample in FIG. 5b, the glaze was applied to cover edges 8c and 8d, and the width d of the film 3 provided on the side surface 8a, 8b along the edge 8c, 8d was 8 mm. Seventy % of the entire surface of the test sample in FIG. 5c, excluding the sliding surface 9, was covered with the glaze.

With respect to the samples of FIGS. 5a through 5d, and a sample having no glaze, the temperature difference causing cracks in heating-cooling test was measured, and the following results were obtained.

TABLE 3

| | Temperature difference causing cracks in heating-cooling test (°C.) |
| --- | --- |
| Sample coated with no glaze | 120 |
| Sample in FIG. 5a | 165 |
| Sample in FIG. 5b | 178 |
| Sample in FIG. 5c | 188 |
| Sample in FIG. 5d | 208 |

The coating pattern in FIG. 5a was fundamentally employed, and the area of the glazed surface was varied. With respect to test samples thus obtained, the temperature differences causing cracks in heating-cooling test were measured, and the following results were obtained.

TABLE 4

| Area of glazed surface (%) | Temperature difference in causing cracks in heating-cooling test (°C.) |
| --- | --- |
| 0 | 120 |
| 40 | 130 |
| 50 | 165 |
| 60 | 178 |
| 70 | 188 |

EXPERIMENT 6

Main bodies 8 having the dimensions given in Experiment 1 were first prepared as Sample No. 1, in which the content of alumina was 96% by weight. The main body 8 was examined as Sample No. 1. Then, such a main body 8 was fitted into a sealing structure 1 as shown in FIGS. 6 through 8. A frame body 2 and a slip fall-preventing member 7 were made of SUS 430 steel having a thickness of 3 mm. The resulting sealing structure was examined as Sample No. 2.

Then, the entire surface of the main body 8, excluding a sliding surface 9, was coated with a glaze in a thickness of 550±50 μm. Difference in coefficient of thermal expansion between the glaze and the main body 8 was set at $46 \times 10^{-7}/°C$. (Sample No. 3). Next, this Sample No. 3 was fitted into the sealing structure 1 as shown in FIGS. 6 through 8. The frame body 2 and the slip fall-preventing member 7 were made of SUS 430 steel having a thickness of 3 mm. This sample was examined as Sample No. 4.

With respect to these Sample Nos. 1 through 4, temperature differences causing cracks in heating-cooling test were measured, and results are shown in Table 5.

TABLE 5

| Sample | Temperature difference causing cracks in heating-cooling test (°C.) |
| --- | --- |
| Sample No. 1 | 120 ± 11 |
| Sample No. 2 | 140 ± 14 |
| Sample No. 3 | 208 ± 17 |
| Sample No. 4 | 253 ± 13 |

As is seen from the above results, Sample Nos. 3 coated with the glaze according to the present invention had conspicuously improved thermal shock resistance. Sample No. 4 which corresponded to Sample No. 3 covered with the metallic plate exhibited more improvement in thermal shock resistance, because the metallic plate afforded great buffer effect against thermal shock.

According to the present invention, since the main body of the sealing member for the gas preheater is made of alumina ceramic, the worn amount of the sliding surface of the sealing member can be reduced, and corrosion of the sealing member with oxides of sulfur and oxides of nitrogen can be suppressed.

In addition, since the surface of the main body is provided with the film of the glaze having the coefficient of thermal expansion smaller than that of the main body made of alumina ceramic, the glaze acts as compressing glaze so that the glaze protects the alumina ceramic main body against the thermal shock due to washing with water. By so doing, high wear resistance, high corrosion resistance, high thermal shock resistance and high thermal shock resistance can be simultaneously imparted to the sealing member, and excellent sealing performance can be maintained for a long time period.

Next, an explanation is provided for the sealing structure for the gas preheater according to the present invention, which sealing structure is adapted to seal a gap between the outer periphery of the rotor and housing of the gas preheater or a gap between a side face of the rotor and the radial sealing member. This sealing structure includes a sealing member at least partially made of an inorganic glass and/or a wear resistive ceramic and a solid lubricant-molded body pressed against a sliding surface of an opponent member upon which the sealing member is to be slid.

As means for pressing the solid lubricant-molded body against the sliding surface upon of the opponent member which the sealing member is to be slid, various means may be employed which press the molded body against the sliding surface and continuously supply the solid lubricant to the sealing surface as the molded body is worn.

In the following, preferable sealing structures will be explained with reference to FIGS. 11 and 12. In the explanation below and drawings, the same reference numerals are given to the same or similar parts as in the above-mentioned embodiments.

A hollow frame body 2 having an almost parallelopiped shape is preferably made of a corrosion-resistive steel, and vertex portions of the frame body 2 are rounded. The frame body 2 is formed with a plurality (three in this embodiment) of holes 2a and 2b in a longitudinal direction and on a side opposed to a sealing bar. In this embodiment, among the holes, a slip fall-preventing member 7 is fixed on an inner side of each of two holes 2a at end sides of the frame member by welding or the like. That flat sealing surface 9 of a sealing member 28 which is to be slid on the sealing bar is exposed, and the remainder is substantially covered with the frame body 2 and the slip fall-preventing member 7, and is not exposed outside.

A pair of opposed guide members 26 are arranged inside the hole 2b. On the other hand, a fitting shaft 23 is projectingly provided on an inner wall surface of the frame body 2 apart from the sealing bar. A long pressing member 24 made of a rigid body or an elastic body is rotatably fitted to the fitting shaft 23. On the other hand, a spiral coil 25 (an urging member) is fitted to the pressing member 24 near the fitting shaft 23 at one end, and fixed to a fitting hole of a fitting metal member 31 at the other end. A groove 30a is formed in a central portion of an end of the solid lubricant-molded body 30, and a tip portion of the pressing member 24 is inserted into the groove 30a so that the pressing member 24 contacts the molded body 30 near the central portion as viewed in the width direction (along the lateral direction in FIG. 11). A guide groove 32 is in a U-shaped form in each of the guides 26, and the pressing member passes the guide grooves 32 of the pair of guides 26 and stops at bottomed portion of the U-shaped guide groove.

A pair of the sealing members 28 are made of inorganic glass or wear resistive ceramic, and their sealing surfaces 9 slide on the sealing bar. The solid lubricant-molded body 30 is urged toward the sealing bar by means of the pressing member 24, and a sliding surface 34 of the molded body 30 slides on the sealing bar.

The entire sealing member 28 may be made of wear resistive ceramic or inorganic glass, or it may be that a portion of the sealing member 28 which is located inside the frame body 2 is made of corrosion resistive steel, and that side of the sealing member which contact the sealing bar is provided with a thin inorganic glass layer made of enamel or glass lining.

As ceramics having high wear resistance, for example, silicon nitride, silicon carbide, alumina, mullite, sialon, zirconia, and alumina-containing porcelain may be utilized. These materials have higher hardness and better wear resistance as compared with metals. Further, although oxides of sulfur, oxides of nitrogen, etc., which are contained in the exhaust gas of the air preheater, produce sulfuric acid, sulfurous acid, nitric acid, nitrous acid, etc., the above-mentioned wear resistive ceramics are stable against such products.

As the inorganic glass or glass lining, a so-called acid-resistive enamel is preferred, and two kinds of industrial use enamels classified by JIS may be utilized by way of example.

| First class: | Glass lining consisting mainly of silica $SiO_2$ (55% or more), $B_2O_3$ (0–10%) and alkali (10–20%). |
| --- | --- |
| Second class: | Acid resistive enamel consisting mainly of silica $SiO_2$ (40% or more), $B_2O_3$ (0–10%) and alkali (10–30%). |

Among the above-mentioned wear resistive ceramics, alumina and zirconia have great coefficients of thermal expansion and poor thermal shock resistance. Therefore, it is preferable to use ceramics having the coefficient of thermal expansion of not more than $70 \times 10^{-7}/°C$., for example, porcelain, mullite, silicon nitride, silicon carbide or sialon.

According to this embodiment, since the sealing member 28 is slid on the sealing bar under pressure, the sealing effect of the wear resistive ceramic or inorganic glass is great. None of deformation, wear or corrosion of the sealing member 28 occur, and formation of a gap between the sealing member and the sealing bar is always prevented so that thermal efficiency can be further improved.

Further, since the solid lubricant is always supplemented onto the surface of the sealing bar from the solid lubricant-molded body 30, the coefficient of friction between the sealing member 28 and the surface of the sealing bar can be reduced, and the service life of the sealing member 28 can be further prolonged owing to reduction in wearing thereof. In addition, the noise level generated by sliding between the sealing member 28 having high hardness and the sealing bar can be reduced.

Therefore, according to this sealing structure, the sealing effect is high, the service life can be prolonged, and the air-preheating efficiency when used in thermal power generation, a ship boiler, etc. can be improved. Moreover, when the sealing structure is applied to a chemical plant or equipment such as an oil-producing, oil-distillation or oil-reforming furnace, heat-recovering efficiency is improved. Furthermore, safety during use is enhanced, and frequency of maintenance can be reduced. Further, noises and uncomfortable sounds resulting from sliding of the sealing member during operation can be reduced to improve the working environment.

Figure 11:
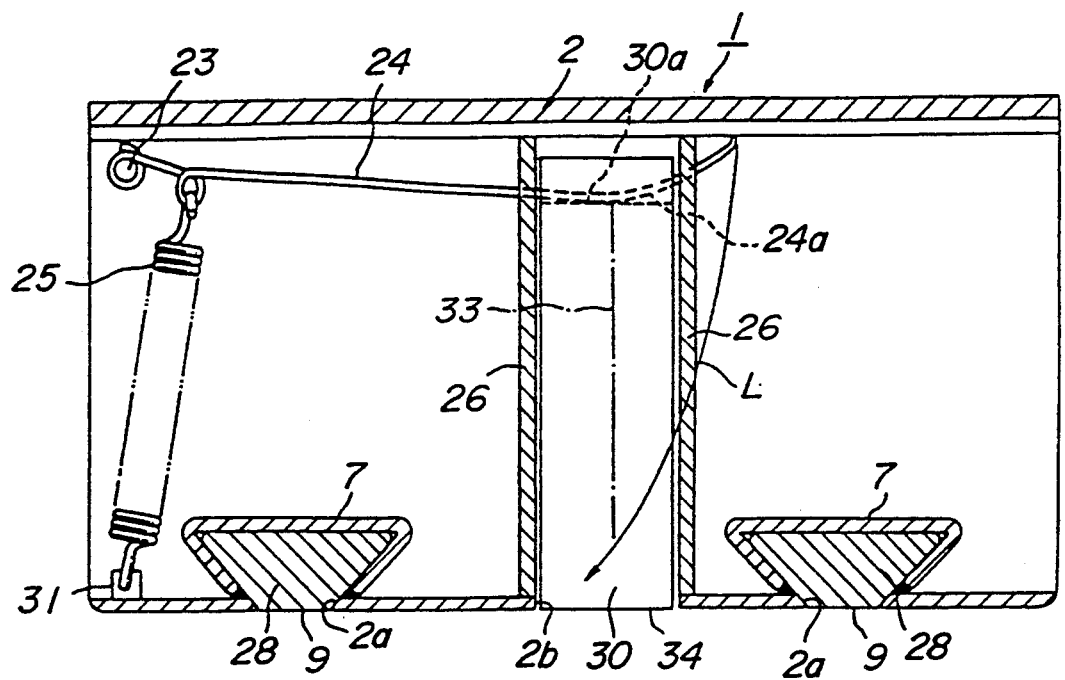
FIG. 11 is a sectional view illustrating another sealing structure according to the present invention.
Figure 12:
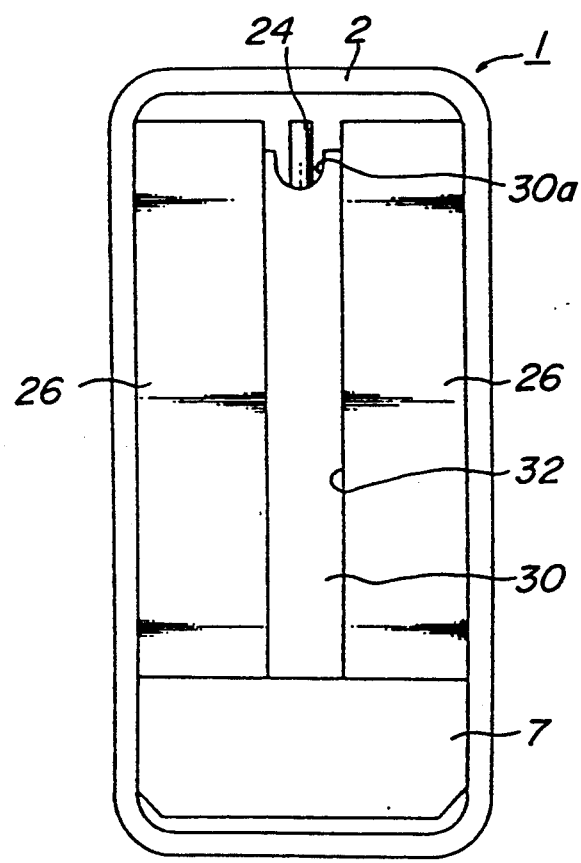
FIG. 12 is a side view of the sealing structure.

Moreover, when the molded body 30 is shortened owing to use for a long time, the pressing member 24 correspondingly turns clockwise in FIG. 11 to continue to press the molded body 30. At that time, the pressing member 24 gradually moves inside the grooves 41 from one end to the other, so that a remotest tip of the pressing member 24 draws a locus as shown in an arrow L. Therefore, the molded body 30 can be used almost all over its entire length, thereby diminishing wasteful use thereof.

Now, considering the fitting shaft 23, the fitting location of the coil spring 25, and the contact of the pressing member 24 with the molded body 30 as a fulcrum, a point of application, and a working point, respectively. Since the distance from the fulcrum to the point of application is considerably shorter than that from the fulcrum to the working point. Thus, even when the working point moves downwardly in FIG. 11, a displacement of the point of application is relatively small. Therefore, since the displacement of the coil spring 25 is small, the urging force (restoring forces) of the coil spring is kept almost constant. Consequently, the pressing force for the molded body 30 can be kept almost constant.

The contacting position (working point) of the pressing member 24 with the molded body 30 is preferably near the central portion of the molded body 30 as viewed in the width direction. By so doing, the molded body 30 can be downwardly pressed in FIG. 11 without being deviated. Therefore, it is preferable that the contacting position of the pressing member 24 with the molded body 30 moves along the locus as in a central line 33 of the molded body. For attaining this, a curved surface 4a on a tip side of the pressing member 24 is formed according to a known design technique so that the contacting position may draw a locus as a central line 33 (a mathematical calculating method is known for this purpose).

As the solid lubricant to be used for the solid lubricant-molded body 30, boron nitride (BN), graphite (C), molybdenum disulfide (MoS$_2$), graphite fluoride (CF)n, tungsten disulfide, and Teflon (TFP, TFEP, TEEP) may be utilized by way of example. The solid lubricant-molded body needs to be pressed against the sealing bar. As to this, a method using the spring is explained in the above embodiment. In the case of a so-called lateral shaft type structure air preheater, a pressing method including such a pressing means needs to be used. On the other hand, in a so-called vertical shaft type structure air preheater, it is not always necessary to use such an urging means, because the solid lubricant-molded body can be pressed against the sealing bar by its own self-weight.

In the sealing structure 1 shown in FIG. 11, since the sealing member 28, excluding the sealing surface 9, is covered with the corrosion resistive steel, the sealing member is more stable against thermal shock produced by washing with water, etc. In this case, wear resistive ceramic having the coefficient of thermal expansion of more than $7 \times 10^{-7}$ (for example, alumina) may be used. When the sealing member is made of alumina ceramic, a film of a glaze having the coefficient of thermal expansion smaller than that of the alumina ceramic may be formed on the surface of the sealing member excluding the sliding surface thereof.

When a ceramic guide o which the sealing member is slid under pressure is formed by assembling or fixing a thin plate of wear resistive ceramic onto the surface of the sealing bar, wearing of the sealing bar can be effectively prevented. As a matter of course, acid resistive enamel or glass lining may be formed on the surface of the sealing bar.

Next, an embodiment in which the present invention is applied to the axial seal A (See FIG. 2) will be explained.

Figure 13:
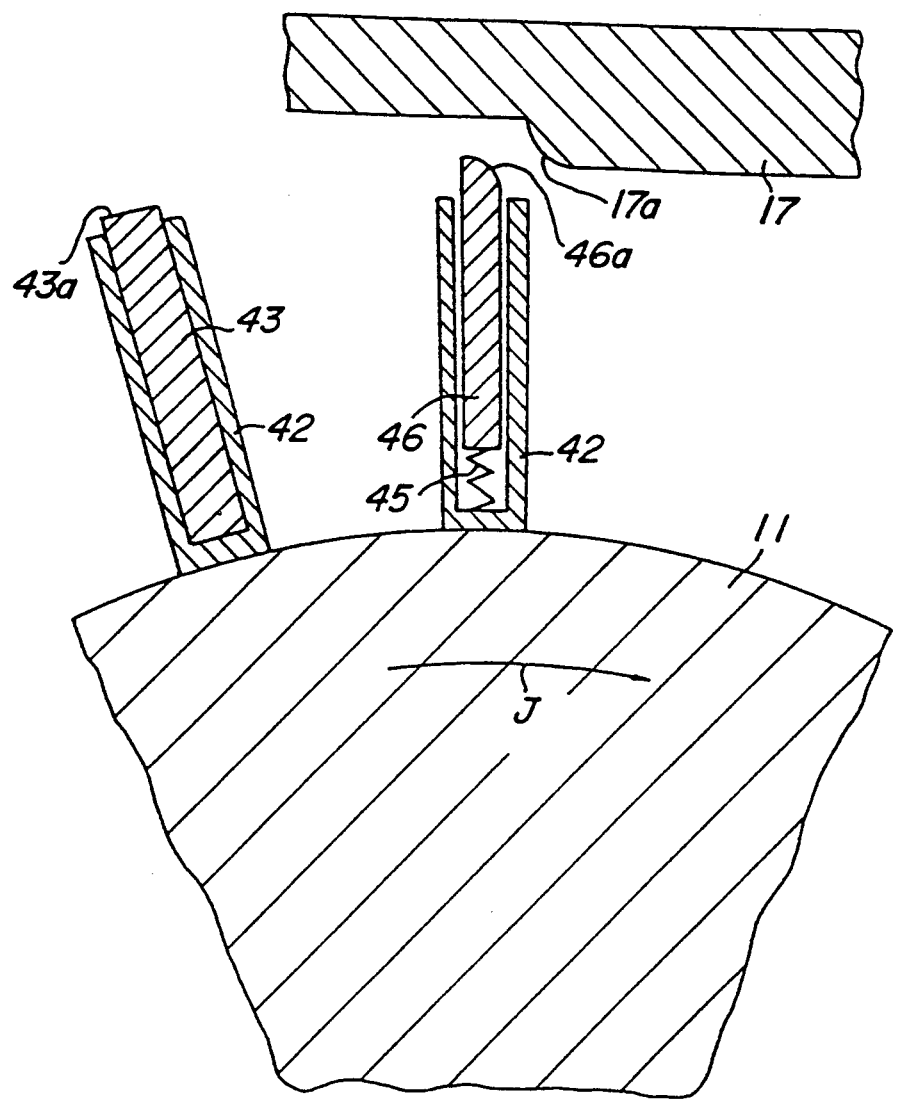
FIG. 13 is a schematic view of a further sealing structure according to the present invention in which a sealing member and a solid lubricant-molded body are attached to an outer peripheral surface of a rotor.

In FIG. 13, a receiving member 42 made of a corrosion resistive metal and having a U-shaped section is fixed, by welding or the like, to the outer periphery of a rotor 11 which is to rotate in a direction of an arrow J. An almost planar sealing member 43 is received and fixed inside the receiving member 42. A sliding surface 43a of the sealing member 43 slides relative to a housing 17 at an area where an axial sealing plate 16 exists. The sealing member 43 may be made of the same material as that of the sealing member 28 (See FIG. 11). For example, the sealing member may be entirely made of wear resistive ceramic or inorganic glass, or only a side of the sealing surface 43a may be provided with glass lining or enamel.

Another receiving member 42 having a U-shaped section is fixed to the outer periphery of the rotor 11, and a solid lubricant-molded body 46 is received in a recess of the receiving member 42 by a spring 45. A smoothly curved portion 46a is formed at an upper end of the molded body 46, and a corresponding curved portion 17a is formed at an inner wall surface of the housing 17. As the rotor 11 rotates in the arrow J direction, curved portion 46a contacts the curved portion 17a, and the solid lubricant-molded body is pressed against the rotor 11 and the spring 45 is compressed. The solid lubricant is uniformly thinly coated onto the inner wall surface of the housing 17, and then the sealing member 43 slides on the inner wall surface of the housing 17.

In this embodiment, the above-mentioned effects can be also obtained by combination of the solid lubricant-molded body 46 and the sealing member 43. In addition, the molded body 46 can be easily and effectively pressed against the inner wall surface of the housing by the urging action of the spring 45. Moreover, since the curved portions 46a and 17a are formed, shock which would be produced when the molded body 26 strikes the housing 17 is dispersed and converted to forces for compressing the spring 45.

Although the sealing member 43 and the solid lubricant-molded body 46 are fitted to separate members, respectively, in the embodiment of FIG. 13, the sealing member and the molded body may be fitted to the same member as shown in FIG. 11. When the axial sealing late is guided by a layer of the wear resistant ceramic or glass lining provided on the inner surface of the housing in the embodiment in FIG. 13 to guide the opposed axial sealing plate, wearing of the metal of the housing can be effectively prevented.

In the following, the construction of a still further preferable embodiment of the sealing structure 1 will be explained with reference to FIG. 14.

A hollow frame body 2 having an almost parallelopiped section is preferably formed from corrosion resistive steel, and vertex portions of the frame body 2 are rounded. The frame body 2 is provided with a plurality (three in this embodiment) of holes 2a and 2b in a longitudinal direction on a side opposed to a sealing bar. In this embodiment, a slip fall-preventing member 7 is fixed on the inner side of the two holes 2a on sides of end portions of the frame body by welding or the like. A strip-like sealing member 28 having a trapezoidal section is inserted into the slip fall-preventing member 7. That flat sliding surface 9 of the sealing member 28 which slides on a sliding surface 19a of the sealing bar is exposed, and the remaining portion is substantially covered with the frame body 2 and the slip fall-preventing member 7, and is not exposed.

Planar guide portions 2d are formed at the edges of the hole 2b, and extend inside the frame body 2. A solid lubricant-molded body 50 having a parallelopiped shape is received along the planar guide portions 2d. The solid lubricant-molded body 50 is pressed against the sliding surface 19a of the sealing bar on which the sliding member 28 slides, and a sealing surface 50a of the molded body 50 is slid relative to the sealing bar.

A through hole having, for example, a round section, is formed in the solid lubricant-molded body 50 as a guide hole 50b, and a tip portion of a guide rod 51 is inserted into the guide hole 50b. The guide rod 51 is so extended that a tip may not contact a sliding surface of such as the sealing bar or a tire of the rotor. A base portion of the guide rod 51 is formed with a male screw 51a, which is screwed through a through hole 2c of the frame body 2. A nut 52 is screwed to the tip portion of the male screw 51a to fix the guide rod 51 to the frame body 2. At this time, loosening of the nut 52 may be prevented by welding the nut to the frame body 2. Alternatively, the guide rod 51 may be directly welded to the frame body 2 without using the nut or the like.

A coil spring 52 is arranged around the guide rod 51. One end of the coil spring 52 is butted against the inner wall surface of the frame body 2, and the other end is butted against a flat plate 53 placed on a top face of the solid lubricant-molded body. The fat plate 53 is provided with a round through hole as a guide hole 53a. The solid lubricant-molded body 50 contacts the flat plate 53, so that the solid lubricant-molded body is pressed against the sliding surface 19a by means of the coil spring 52 though the flat plate 53. By so doing, the solid lubricant-molded body 50 is urged in a longitudinal direction of the guide rod 51, so that the molded body 50 can be pressed against the sliding surface 19a of the sealing bar.

In this embodiment, the same or similar materials may be used as the material of the sealing member, and the same or similar effects can be also obtained.

In addition, while the solid lubricant-molded body 50 is guided by the guide rod 51, the molded body 50 is urged and pressed by the coil spring 52. Thus, the solid lubricant-molded body 50 can be easily exchanged by extracting the molded body in the longitudinal direction of the guide rod 51. Further, since the structure for urging the molded body 50 has a smaller number of constituent parts, the sealing structure is unlikely to suffer trouble, and can be easily maintained and a production cost thereof can be reduced.

The solid lubricant-molded body 50 is not completely surrounded by the corrosion resistive steel, and a contact length between the molded body 50 and the planar guide portions 2d is relatively small. Therefore, even if a solid component such as coal ash is clogged between the molded body 50 and the planar guide 2d, the clogged material is pushed outside, following movement of the shaped body 50, or slips out into the interior of the frame body 2. Therefore, interruption of the movement of the molded body 50 owing to fixing of the solid component around the periphery of the molded body 50 can be prevented, so that the molded body can be always pressed toward the sliding surface 19a.

Furthermore, since the coil spring 52 is used as the means for urging the molded body 50, the molded body 50 can be effectively pressed against the sliding surface 19a even in the case that the sealing structure according to the present invention is applied to the lateral shaft type air preheater in which the solid lubricant-molded body needs be horizontally pressed. The sealing structure can also be effectively applied to the vertical shaft type air preheater in which the molded body needs be urged in a direction reverse to the gravitational forces.

Furthermore, the width of the flat plate 53 is made greater than the distance between the planar guide portions 2d. Therefore, the planar plate 53 is stopped by the guide portions 2d even when the solid lubricant-molded body 50 is exhausted or lost. Therefore, there is no fear that the coil spring 52 contacts and slides on the sliding surface.

As the material used for the coil spring, heat resistive alloys capable of maintaining spring property even at high temperatures of, for example, 350° to 400° C., such as Inconel (trade name), may be utilized for example. In addition, when a natural length of the coil spring is made greater and the spring constant of the spring is made smaller, variation in load can be made smaller against variation in the length of the spring, so that the solid lubricant-molded body so can be pressed by stable forces.

As a solid lubricant to be used for the solid lubricant-molded body, the above-mentioned boron nitride (BN), graphite (C), molybdenum disulfide ($MoS_2$), graphite fluoride $(CF)_n$, tungsten disulfide ($WS_2$) and Teflon (TFP, TFEP and TEEP) may be utilized for example.

Figure 14:
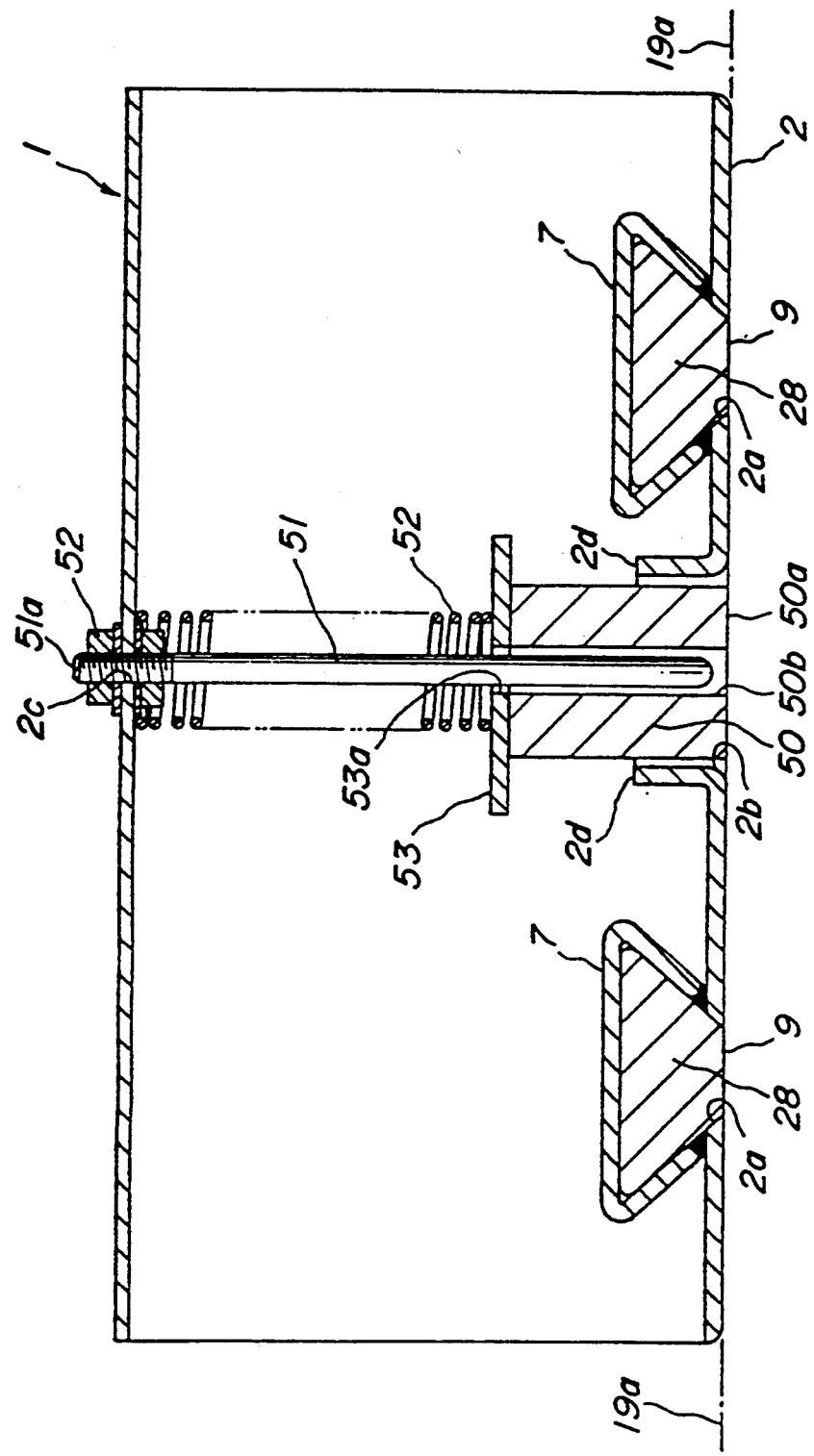
FIG. 14 is a sectional view of a still further sealing structure according to the present invention.

In the sealing structure shown in FIG. 14, since the sealing member 28 is entirely surrounded by the corrosion resistive steel, excluding the sliding surface 28a, the sealing structure can be made more stable against thermal shock produced by washing with water or the like. In this case, wear resistive alumina ceramic having the coefficient of thermal expansion of more than $70 \times 10^{-7}/°C.$ may be used. Further, the sealing member of the alumina ceramic may be covered with a film made of a glaze having a coefficient of thermal expansion smaller than that of the alumina ceramic as mentioned before. When the content of alumina in the alumina ceramic is not less than 96% by weight, the highest wear resistance can be obtained As the material of the frame body 2, for example, stainless steel, Inconel and nickel may be utilized, for example.

When a ceramic guide upon which the sealing member is to be slid under pressure is formed by assembling or fixing a thin plate of wear resistive ceramic onto the sliding surface of the sealing bar, wearing of the sealing bar can be effectively prevented as mentioned before. As a matter of course, the sliding surface of the sealing bar may be provided with acid resistive enamel or glass lining.

Figure 15:
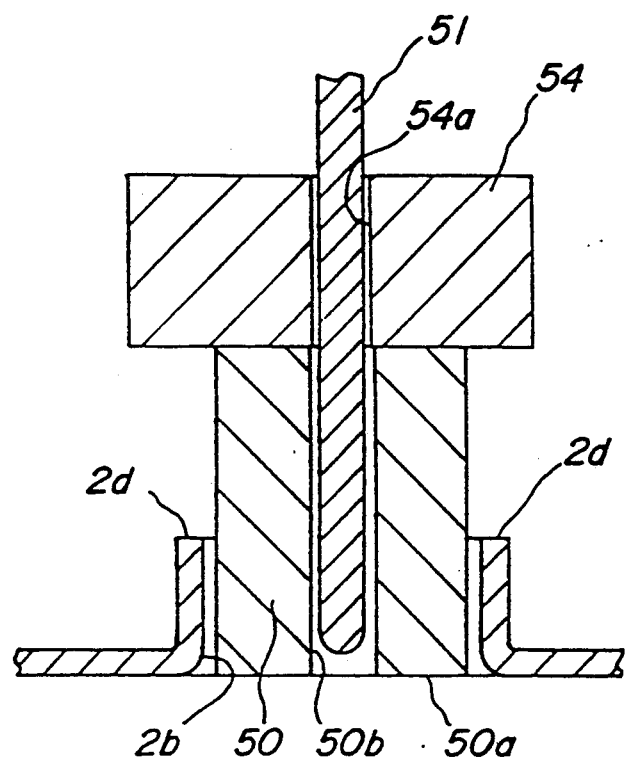
FIG. 15 is a sectional view of a principal portion of a still further sealing structure according to the present invention in which a weight is used.

In the case of a bypass seal for the vertical shaft type air preheater in which the sealing surface 9a is located perpendicularly under the sealing structure, a weight 54 may be used as an urging means for the solid lubricant-molded body 50 as shown in an enlarged sectional view of FIG. 15.

The shape of the weight 54 is, for example, rectangular, and a through hole having, for example, a round section, is formed through the weight as a guide hole 54a. A guide rod 51 is inserted into the guide hole 54a. The weight 54 applies load upon the solid lubricant-molded body 50, and the molded body 50 is pressed against the sliding surface mainly by this load at constant forces.

In this embodiment, the same effects as in that of FIG. 14 can be obtained. Further, since the width of the weight 54 is greater than the distance of the planar guide portions 2d, the weight 54 is stopped by the planar guide portions 2d, even when the solid lubricant-molded body disappears. Accordingly, the weight 54 will never contact the sliding surface.

Figure 16:
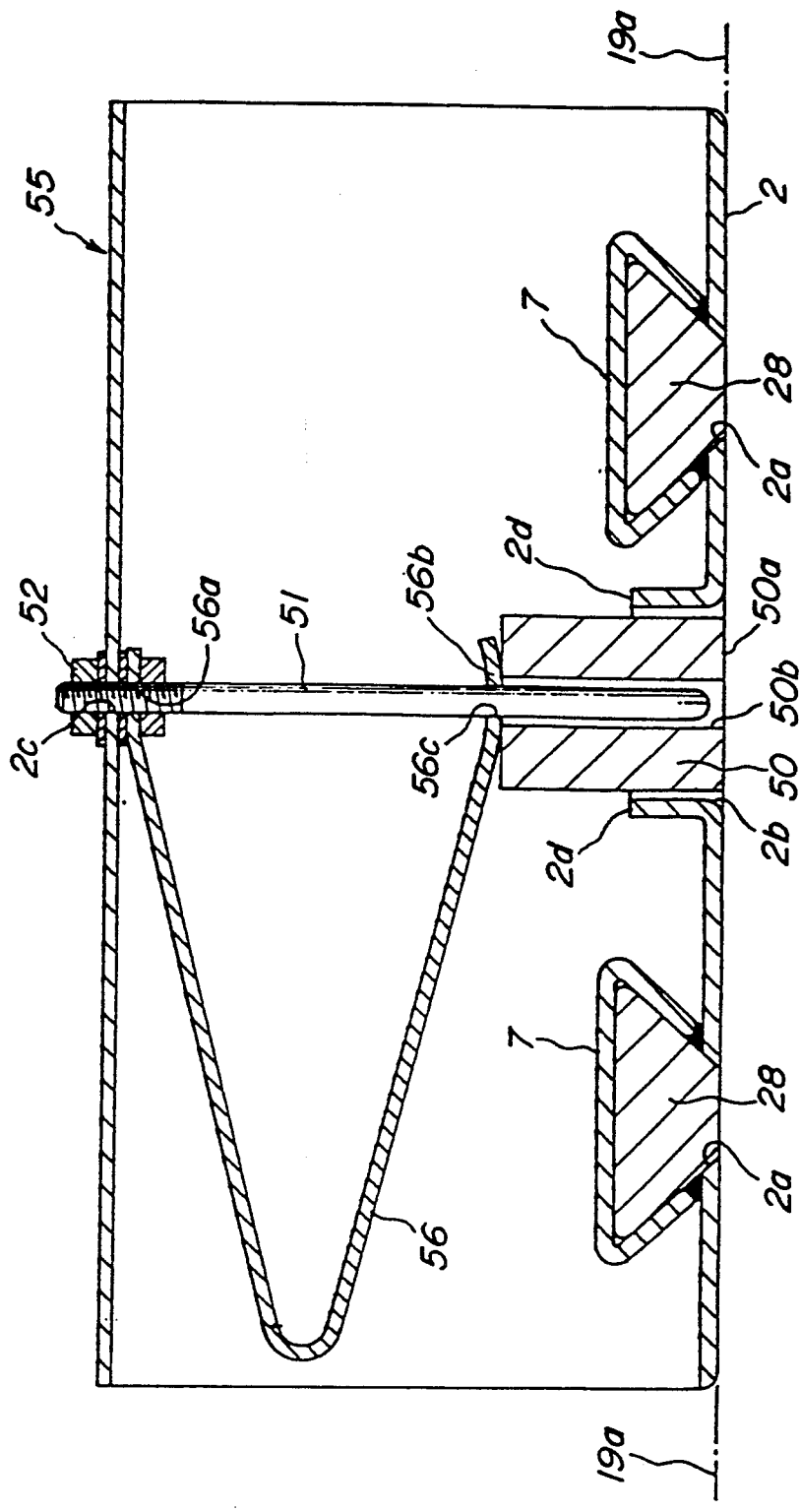
FIG. 16 is a sectional view of a still further sealing structure according to the present invention in which a leaf spring is used as an urging means.

FIG. 16 is a sectional view showing a sealing structure in which a leaf spring is used, as an urging means, instead of the coil spring. In FIG. 16, the same reference numerals are given to the same or similar parts as in those in FIG. 14, and their explanation will be omitted.

The leaf spring 56 is a spring formed by working a strip-like planar metal in a bent form as viewed in section. Round through holes 56a and 56c are formed in opposite ends of the leaf spring 56, respectively, and a guide rod 51 is inserted through the round through holes 56a and 56c. An end portion of the leaf spring on the side of the round through hole 56a is engaged with a nut 52 to fix the leaf spring to the frame body 2. The other end portion 56b of the leaf spring 56 on the side of the round through hole 56c is butted against the solid lubricant-molded body 50. Between a pair of the end portions of the leaf spring 56 are applied forces for enlarging the bent angle of the leaf spring to press and urge the molded body 50 toward the sliding surface 19a.

Next, a further embodiment of the sealing structure in which the present invention is applied to the axial seal A (See FIG. 2) will be explained.

Figure 17:
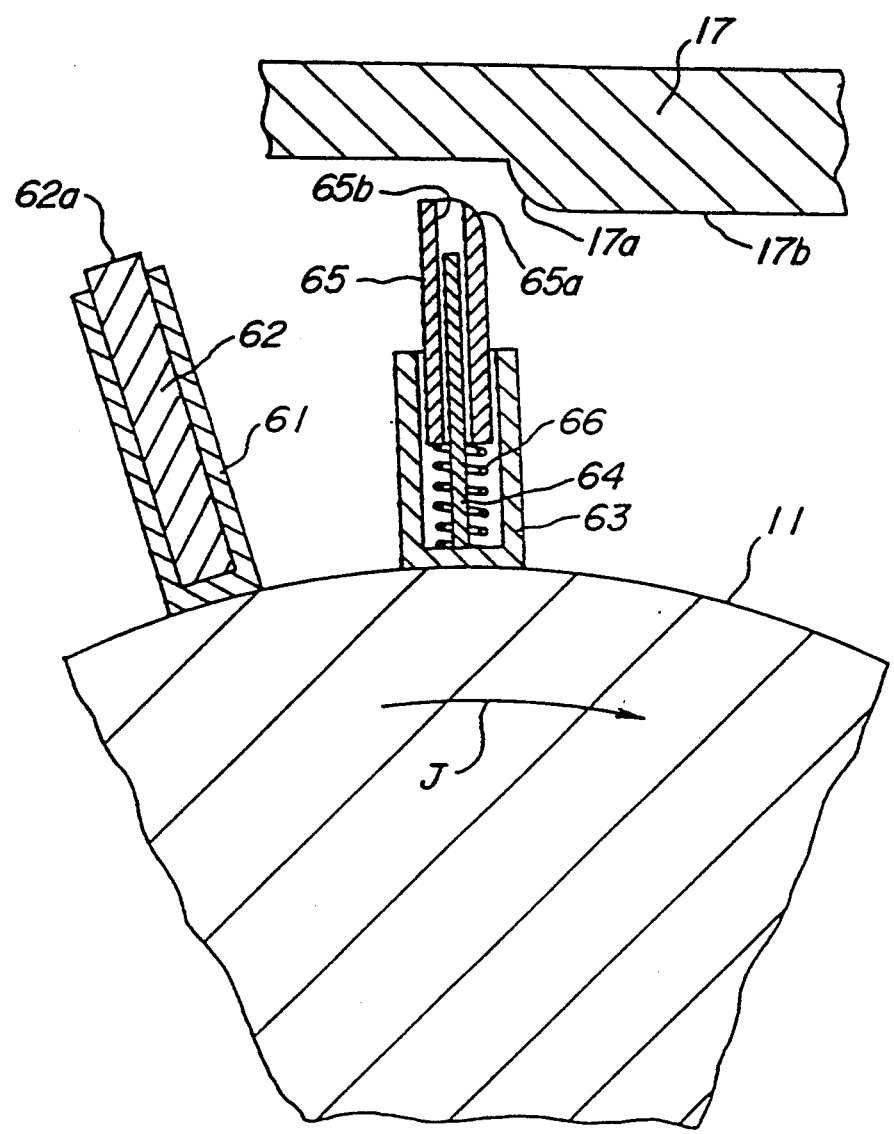
FIG. 17 is a schematic sectional view of a part of a still further sealing structure in which a sealing member and a solid lubricant-molded body are attached to an outer periphery of the rotor.

In FIG. 17, a receiving member 61 made of a corrosion resistive metal and having a U-shaped section is fixed, by welding or the like, to the outer periphery of a rotor 11 which rotates in a direction of an arrow J. An almost flat sealing member 62 is placed and fixed inside the receiving member 61. A sliding surface 62a of the sealing member 62 slides relative to a housing 17 at an area where a radial sealing plate 13 exists. The sealing member may be made of the same material as that of the above-mentioned sealing member (See FIG. 14). The sealing member may be entirely made of wear resistive ceramic or inorganic glass, or the sealing member may be provided with glass lining or enamel on the side of the sliding surface 62a.

Another receiving member 63 made of corrosion resistive metal and having a U-shaped section is fixed to the outer periphery of the rotor 11 by welding or the like. A guide rod 64 is fixed inside the receiving member 63, and extends in a radial direction of the rotor 11. A through hole having, for example, a round section, is formed in a solid lubricant-molded body 65 having an almost parallelopiped shape as a guide hole 65b, and the guide rod 64 is inserted into the guide hole 65b. A coil spring 66 is arranged around the guide rod 64. The coil spring 66 contacts an inner surface of the receiving member 63 at one end, and contacts a surface of the solid lubricant-molded body 65 at the other end. Thereby, the solid lubricant-molded body 65 is guided in a longitudinal direction of the guide rod 64 (the radial direction of the rotor 11).

A sliding surface 65 is formed, as a smoothly curved surface, at an upper end of the solid lubricant-molded body 65. A curved surface 17a is correspondingly formed on an inner wall surface 17b (sliding surface) of the housing 17. As the rotor 11 rotates in a direction of an arrow J, the curved sliding surface 65a first contacts the curved surface 17a. With the further rotation of the rotor 11, the molded body 65 is pressed toward the rotor 11 and the coil spring 66 is compressed. The sliding surface 65a is urged and pressed against the sliding surface 17a of the housing 17. As a result, the solid lubricant is uniformly thinly coated onto the sliding surface 17b of the housing 17, and then sliding surface 62a of the sealing member 62 slides on the sliding surface 17b of the housing.

In this embodiment, the same effects as mentioned above can be also attained by the combination of the solid lubricant-molded body 65 and the sealing member 62. Further, the molded body 65 can be easily and effectively pressed against the sliding surface 17b of the housing by being urged by the coil spring 66. Furthermore, since the curved surfaces 65a and 17a are provided, the shock which would be generated when the molded body 65 strikes the housing 17 is dispersed, and such shock can be converted to forces for compressing the coil spring 66.

In the embodiment of FIG. 17, although the sealing member 62 and the solid lubricant-molded body 65 are fitted to the separate members, respectively, the sealing member and the solid lubricant-molded body may be fitted to the same member as shown in FIG. 14. Further, in the embodiment of FIG. 17, wearing of the metal constituting the housing can be effectively prevented by sliding the sealing member 62 on an opposed wear resistive ceramic or glass lining layer provided on an inner surface of the housing.

EXPERIMENT 7

Next, simulation tests were effected mainly with respect to reduction in sliding sounds of the sealing member and improvement on wear resistance with the use of the solid lubricant.

A sliding test was effected according to a ring-on-disc process, in which a sound level meter (trade name: NA23 manufactured by Saon, Co., Ltd.) was set at a location spaced from a sliding portion by 5 cm, and an intensity of sliding sounds was measured. A value obtained by deducting an intensity of sounds on non-sliding (noises generated from the gas preheater itself, etc.) from that of sounds during sliding was taken as an intensity of the sliding sound. By analyzing the frequencies of the sliding sounds, presence or absence of vibrations during the sliding was checked, and the specific worn amount and the coefficient of friction of the ring were measured.

Figure 18:
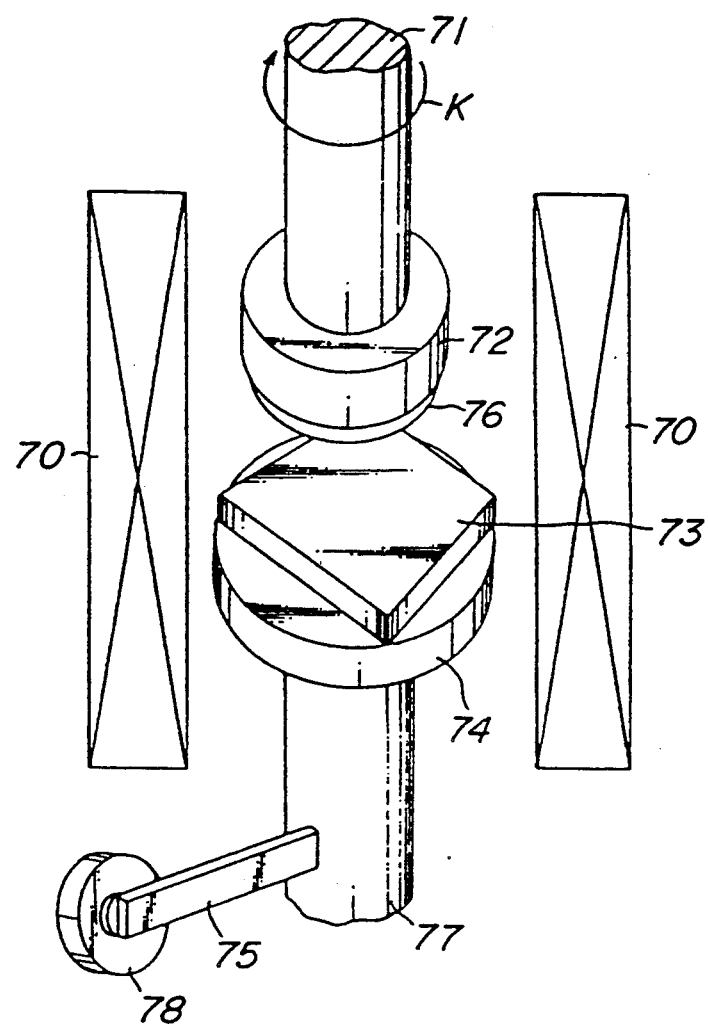
FIG. 18 is a contact type stress fatigue rupture tester.

FIG. 18 shows the outline of a contact stress fatigue rupture tester used in this test. A load is applied between a sample plate 73 and a ring 76 by pushing up a lower sample plate-holding jig 74 by means of a hydraulic pressure of a piston. When an upper ring-holding jig 72 fixed to a rotary shaft 71 is rotated in a direction of an arrow K, the sample plate 73 and the ring 76 undergo friction and wearing. These constituent parts are placed in an electric furnace 70 which can be set to any arbitrary atmosphere and temperature. Rotary torque is generated for the sample plate 73 by the frictional forces, and transmitted to a piston 77, so that a torque lever 75 attached to the piston 77 pushes a load cell 78. The coefficient of friction, $\mu$, can be calculated from an equation: $\mu = TR/10W$ in which W is a load (kgf) between the sample plate 73 and the ring 76, T is a value (kgf) obtained by converting an output from the load cell 78 to a load, and R is an average radius (cm) of the ring 76.

On the other hand, with respect to each of the tested sample plates 73, the depth of worn groove was measured by a surface roughness meter, and a worn volume was calculated by multiplying the depth by a contact area with the ring 76. With respect to the ring, a worn volume was calculated from a reduction in height thereof. The specific worn amount Ws can be calculated from an equation: $Ws = M/Px$ in which M is the worn volume, P is the load, and x is a sliding distance (rpm of ring $\times$ tested time period $\times$ average circumferential length of the ring).

The testing was carried out under conditions as near as those in actual operation of the air preheater. However, a low load could not be used from the standpoint of performances of the tester, and the load being ten times as great as that in the actual operation of the preheater was employed. Further, when the worn amount was too small to measure, the sliding speed was increased to effect the testing as an acceleration test.

For the testing, five kinds of sample plates were prepared.

A: Sample A was entirely made of alumina, which corresponds to the sealing structure 1 in FIG. 11 except that a portion of a sample plate which contacted the sealing bar was entirely made of alumina.

B: In Sample B, 15% of an area of that portion of the planar sample which contacted the ring was made of alumina, and the remaining area was made of SUS 430 steel. This sample corresponds to the sealing structure as shown in FIG. 11 except that no solid lubricant-molded body 30 existed, and instead the surface of the frame body corresponding to the solid lubricant-molded body was made of SUS 430 steel.

C: In Sample C, 15% of an area of that portion of the planar sample which contacted the ring was made of graphite (carbon), another 15% was made of alumina and the remainder of 70% was made of SUS 430. This corresponds to the embodiment in FIG. 11.

D: Sample D was entirely made of alumina. This sample corresponds to the sealing structure 1 in FIG. 14 except that a portion of the sealing member which contacted the sealing bar was entirely made of alumina.

E: Sample E, 15% of an area of that portion of the planar sample which contacted the ring was made of alumina, another 15% was made of alumina and the remainder was made of SUS 430. This corresponds to the embodiment in FIG. 14.

Various performances of Samples A, B, C, D and E are shown in Table 6.

TABLE 6

| Sample | A | B | C | D | E |
| --- | --- | --- | --- | --- | --- |
| Intensity of sliding sounds | 14 dB | 10 dB | 4 dB | 14 dB | 4 dB |
| Frequency of sounds at maximum intensity | 8 kHz | 8 kHz | 1 kHz | 8 kHz | 1 kHz |
| Vibrations on sliding | vibrated | not vibrated | not vibrated | vibrated | not vibrated |
| Specific worn amount $\times 10^{-9}$ mm$^2$/N | 0.1 | 12 | 5.2 | 0.1 | 5.2 |
| Wear coefficient | 0.8 | 0.9 | 0.4 | 0.8 | 0.4 |

As is clear from the above results, the sealing structures using the solid lubricant-molded bodies could simultaneously attain an excellent lubricating effect and greatly improved performances such as low noise level, high wear resistance and low wear. Owing to such improved performances, working environment can be improved, long service life of the sealing structure can be attained, frequency of maintenance of the air preheater can be greatly reduced, and cost can be largely reduced.

Particularly, since the solid lubricant is used, the frequency of main component of sliding sounds is changed from grating ear-offensive sounds at 8 kHz to small hissing sounds at 1 kHz. Not only is the overall sound level reduced, but also the level of audible noises.

According to the sealing structure of the present invention for the gas preheater, since at least part of the sealing member is made of inorganic glass and/or wear resistive ceramic, corrosion with hot exhaust gas can be effectively prevented, wear resistance can be improved, and excellent sealing performance can be maintained for a long time period.

Moreover, since the solid lubricant-molded body is pressed against the surface upon which the sealing member slides, the solid lubricant is always fed onto the sealing member-sliding surface. Accordingly, the coefficient of friction between the sealing member and the sliding surface can be reduced, and wearing of the sealing member can be reduced to further prolong the service life. In addition, the level of the noises and uncomfortable sounds resulting from the sliding of the high hardness sealing member can be lowered. Therefore, noises and uncomfortable sounds of the sealing member during operation can be also reduced to improve the working environment.

In addition, since the sealing structure is constructed such that the guide member is inserted into the guide hole in the solid lubricant-molded body and the molded body is urged and pressed against the sliding surface while being guided, the solid lubricant-molded body can be easily changed by pulling out the molded body in the longitudinal direction of the guide member. Furthermore, the structure for urging the molded body is difficult to be damaged, its maintenance is easy, and production cost can be reduced.

What is claimed is:

1. A sealing structure for a rotary regeneration-type heat exchanger, said sealing structure being adapted to seal at least one of a gap between an outer peripheral portion of a rotor and a stationary housing and a gap between a side face of the rotor and a radial sealing plate, said sealing structure being held by one of the rotor and the housing such that said sealing structure is in sliding contact with an opposing surface of the other of the rotor and the housing, said sealing structure comprising:

a metal frame;

a main body comprising an alumina body and a glaze covering a portion of said alumina body, said glaze having a coefficient of thermal expansion smaller than that of said alumina body, said main body comprising an uncovered surface which is not covered with said glaze thereby exposing said alumina body; and retaining means for retaining said main body inside said metal frame, wherein said uncovered surface is exposed from said metal frame, said uncovered surface at least partially defining a sliding surface of said sealing structure.

2. The sealing structure of claim 1, wherein said uncovered surface of said main body is substantially flush with a surrounding surface of said metal frame such that said sliding surface of said sealing structure further comprises said surrounding surface of said metal frame.

3. The sealing structure of claim 1, wherein said metal frame is hollow and said retaining means comprises a hollow retaining member which receives said main body, said hollow retaining member fixed to said metal frame and projecting into an interior space of said metal frame, said metal frame and said hollowing retaining member covering substantially all surfaces of the main body except for said uncovered surface.

4. The sealing structure of claim 1, wherein a difference of thermal expansion coefficients between said alumina body and said glaze is not less than $9 \times 10^{-7}$/°C. and not more than $50 \times 10^{-7}$/°C.

5. The sealing structure of claim 1, wherein the alumina body contains not less than 85% by weight of alumina.

6. The sealing structure of claim 1, wherein only said uncovered surface of said main body is exposed from said metal frame, and not less than 50% of a total surface area of the alumina body excluding said sliding surface is covered with said glaze.

7. The sealing structure of claim 6, wherein a thickness of said glaze is not less than 100 $\mu$m.

8. The sealing structure of claim 6, wherein all edge portions and vertex portions of said alumina body which do not constitute a portion of said sliding surface are covered with said glaze.

9. The sealing structure of claim 6, wherein all outer surface of the main body excluding said uncovered surface are substantially covered with a metal.

10. The sealing structure of claim 1, wherein a radius of curvature of each edge portion and vertex portion of said alumina said main body is not less than 2 mm.

11. The sealing structure of claim 1, wherein said glaze comprises 60.0-75.0% by weight of $SiO_2$, 11.0-17.0% by weight of $Al_2O_3$, less than 0.7% by weight of $Fe_2O_3$, less than 0.3% by weight of $TiO_2$, 1.0-5.0% by weight of CaO, 1.0-5.5% by weight of MgO, 3.0-8.0% by weight of $K_2O$ and $Na_2O$, 1.5-3.5% by weight of $ZrO_2$, less than 4.0% by weight of BaO and less than 0.3% by weight of MnO and CoO.

12. The sealing structure of claim 1, further comprising a molded body of a solid lubricant, wherein a surface of said molded body is exposed from said metal frame thereby defining an exposed surface of said molded body, said sliding surface of said sealing structure further comprising said exposed surface of said molded body.

13. The sealing structure of claim 12, further comprising pressing means for pressing said molded body against the opposing surface of the other of the rotor and the housing, said pressing means comprising a pressing member having one end rotatably fitted to a fitting shaft fixed to said metal frame, a second end of said pressing member contacting said molded body, and an urging member attached to said pressing member to urge the pressing member toward the opposing surface of the other of the rotor and the housing.

14. The sealing structure of claim 12, further comprising pressing means for pressing said molded body against the opposing surface of the other of the rotor and the housing, said pressing means comprising a guide member inserted into a guide hole formed in said molded body, said molded body being axially movable along said guide member, and an urging member for pressing the molded body against said opposing surface, said urging member acting along the longitudinal direction of the guide member.

* * * * *